US011996060B2

(12) United States Patent
Mochizuki et al.

(10) Patent No.: US 11,996,060 B2
(45) Date of Patent: May 28, 2024

(54) DISPLAY SYSTEM HAVING DATA PROCESSING UNIT TO PARTITION DISPLAY DATA PIXELS

(71) Applicant: SEIKO EPSON CORPORATION, Tokyo (JP)

(72) Inventors: Kota Mochizuki, Chino (JP); Akira Morita, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/688,324

(22) Filed: Mar. 7, 2022

(65) Prior Publication Data

US 2022/0284868 A1 Sep. 8, 2022

(30) Foreign Application Priority Data

Mar. 8, 2021 (JP) ................................ 2021-036250

(51) Int. Cl.
*G09G 3/36* (2006.01)

(52) U.S. Cl.
CPC ....... *G09G 3/36* (2013.01); *G09G 2320/0252* (2013.01); *G09G 2360/16* (2013.01)

(58) Field of Classification Search
CPC .................. G09G 3/20; G09G 3/2007; G09G 3/2018–204; G09G 3/2059–2066; G09G 3/2092–2096; G09G 3/36; G09G 3/3611; G09G 3/3648; G09G 2300/0804; G09G 2310/021; G09G 2310/0213; G09G 2310/0297; G09G 2310/04; G09G 2310/08; G09G 2320/0209; G09G 2320/0252; G09G 2320/0271; G09G 2360/16

See application file for complete search history.

(56) References Cited

U.S. PATENT DOCUMENTS 5,666,137 A * 9/1997 Coelho ................ H04N 11/042 348/453
5,828,362 A * 10/1998 Takahashi ................ H04N 9/68 345/589
6,091,398 A * 7/2000 Shigeta ................ G09G 3/2022 358/1.9

(Continued)

FOREIGN PATENT DOCUMENTS

JP H08-305341 A 11/1996
JP 2000-042247 A 2/2000

*Primary Examiner* — Keith L Crawley
(74) *Attorney, Agent, or Firm* — Oliff PLC

(57) ABSTRACT

A display system includes a data processing unit and a liquid crystal panel. The data processing unit partitions display data pixels in one frame into, for example, blocks of four pixels in two rows×two columns, performs predetermined processing on display data of four display data pixels, and transmits processing data with an amount of data of ¼ pixels to the liquid crystal panel in four subframes. Panel pixels of the liquid crystal panel are partitioned into blocks of four pixels in two rows×two columns, data signals based on processing data are provided to four panel pixels included in one block in a subframe f1 among the four subframes, and of the four subframes, in subframes f2 to f4, data signals based on the processing data are provided in a predetermined order to three of the panel pixels included in the one block.

8 Claims, 20 Drawing Sheets

(56) References Cited

U.S. PATENT DOCUMENTS

| | | | | |
|---|---|---|---|---|
| 6,559,855 | B1 * | 5/2003 | Kawase | G09G 5/006 345/694 |
| 2007/0200807 | A1 * | 8/2007 | Lee | G09G 3/3607 345/88 |
| 2007/0236422 | A1 * | 10/2007 | Park | G09G 3/3291 345/76 |
| 2008/0018559 | A1 * | 1/2008 | Ochi | G09G 3/2077 345/59 |
| 2009/0128693 | A1 * | 5/2009 | Owaki | G09G 3/2803 348/E7.003 |
| 2015/0091932 | A1 * | 4/2015 | Buckley | G09G 3/2022 345/589 |

* cited by examiner $$a11、a12、a21、a22 = \min(dA11, dA12, dA21, dA22)$$

<PANEL PIXEL (f1)>

$$a12 = dA12 + (dA12 + dA11 - \min(dA11、dA12、dA21、dA22) \cdot 2)/3a$$

<PANEL PIXELS (f2)>

$$a21 = dA21 + (dA21 - \min(dA11、dA12、dA21、dA22))$$

<PANEL PIXELS (f3)>

$$a22 = dA22 + (dA22 - \min(dA11、dA12、dA21、dA22)) \cdot 3$$

<PANEL PIXELS (f4)>

DISPLAY SYSTEM HAVING DATA PROCESSING UNIT TO PARTITION DISPLAY DATA PIXELS

The present application is based on, and claims priority from JP Application Serial Number 2021-036250, filed Mar. 8, 2021, the disclosure of which is hereby incorporated by reference herein in its entirety.

BACKGROUND

1. Technical Field

The present disclosure relates to a display system, for example.

2. Related Art

Techniques have been known in which in order to improve display characteristics of video in a display panel such as an organic EL panel or a liquid crystal panel, display data supplied from a higher device is driven by doubling speed, such as driving at 2× speed or 4× speed. When driving by doubling speed, a drive speed of the display panel is higher than a transfer speed of the display data supplied from the higher device.

Thus, a technique is adopted in which display data supplied from a higher device is stored temporarily in a memory, at the time at which a predetermined amount of data is stored in the memory, the display data stored in the memory is read at a higher speed than a storage speed, and a display panel is driven based on the read data. In this technique, delay occurs in an image displayed on the display panel, with respect to the display data supplied from the higher device.

In order to reduce such delay, for example, a technique has been known in which, for example, display data of one frame is compressed and supplied to a display panel, the compressed display data is decompressed in the display panel, and display is performed based on the decompressed display data (see, for example, JP 2000-42247 A).

However, according to the technique described in JP 2000-42247 A, the delay can be certainly reduced, but in recent years, in a field where real-time display is required, for example, in viewfinders or Esports, there is a demand to further reduce delay.

SUMMARY

A display system according to an aspect of the present disclosure is a display system including a data processing unit and a display panel, wherein the data processing unit partitions display data pixels in one frame into blocks of N pixels corresponding to a in a vertical direction×b in a horizontal direction, (N=a×b, one of a and b is an integer equal to or greater than 1, and another of a and b is an integer equal to or greater than 2), performs predetermined processing on display data of the N display data pixels, transmits processing data with an amount of data of 1/N pixels toward the display panel in N subframes, panel pixels of the display panel are partitioned into blocks of N pixels corresponding to a in a vertical direction×b in a horizontal direction, data signals based on the processing data supplied from the data processing unit are provided to N panel pixels included in one block in particular one subframe of the N subframes, and of the N subframes, and in a subframe other than the particular one subframe, data signals based on the processing data supplied from the data processing unit are provided in a predetermined order to N−1 panel pixels included in the one block.

DESCRIPTION OF EXEMPLARY EMBODIMENTS

Preferred exemplary embodiments of the present disclosure will be described using the accompanying drawings. Note that the exemplary embodiments described hereinafter are not intended to unjustly limit the content of the present disclosure as set forth in the claims. In addition, all of the configurations described below are not necessarily essential constituent requirements of the present disclosure.

First Exemplary Embodiment

Figure 1:
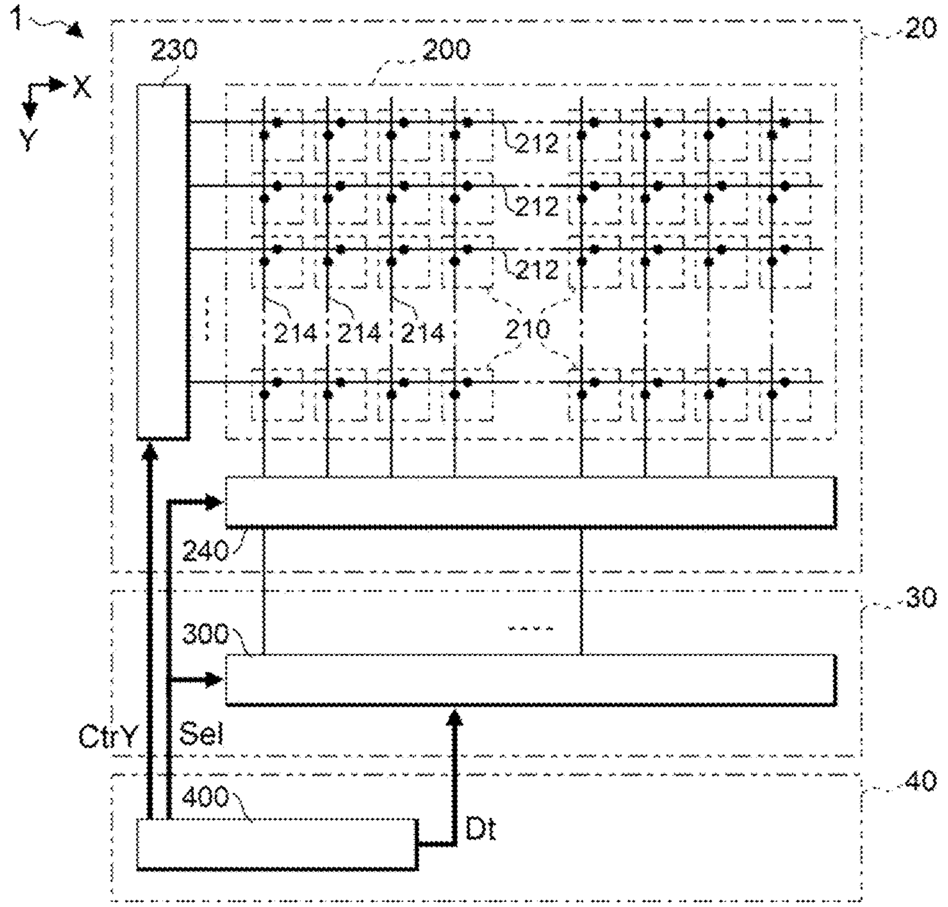
FIG. 1 is a block diagram illustrating a display system according to a first exemplary embodiment.
Figure 2:
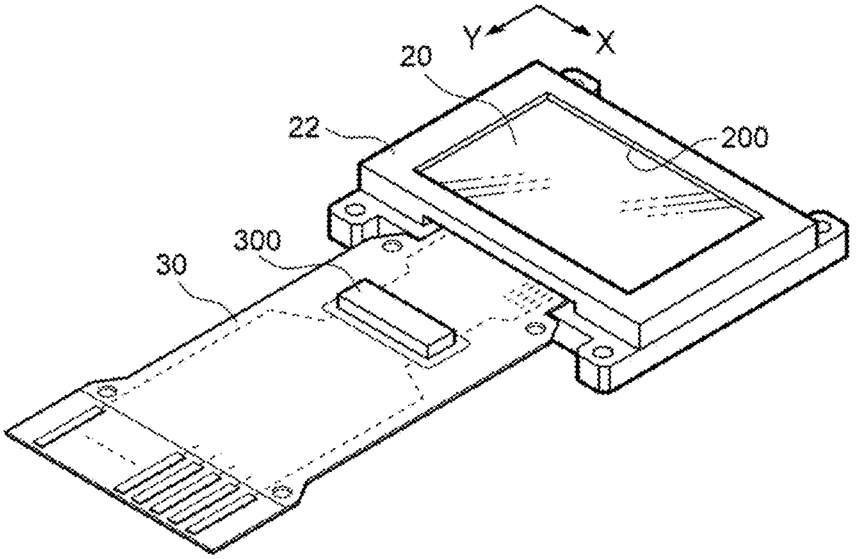
FIG. 2 is a perspective view of a liquid crystal panel in the display system.

FIG. 1 is a block diagram illustrating a configuration of a display system 1 according to a first exemplary embodiment, and FIG. 2 is a perspective view illustrating a liquid crystal panel 20 and an FPC board 30 of the display system 1.

As illustrated in FIG. 1, the display system 1 includes the liquid crystal panel 20, the FPC board 30, and a processing circuit board 40. Note that FPC is an abbreviation for Flexible Printed Circuits. The liquid crystal panel 20 is, for example, of a transmissive type used as a light valve of a liquid crystal projector, and is an example of a display panel.

In the liquid crystal panel 20, pixel circuits 210 corresponding to pixels of an image to be displayed are arrayed in a matrix. In particular, a plurality of scanning lines 212 are provided extending in an X direction in the figure, a plurality of data lines 214 extend in a Y direction, and are provided so as to be mutually and electrically insulated from the scanning lines 212. Then, the pixel circuits 210 are provided corresponding to intersections between the plurality of scanning lines 212 and the plurality of data lines 214.

When the number of scanning lines 212 is m and the number of data lines 214 is n, the pixel circuits 210 are arrayed in a matrix in vertical m rows×horizontal n columns. A region in which the pixel circuits 210 are arrayed in the m rows and n columns is a display region 200.

Note that, m and n are each an integer equal to or greater than 2. Furthermore, m and n are even numbers for convenience.

In the matrix of the scanning lines 212 and the pixel circuits 210, in order to distinguish the rows from each other, the rows may be referred to as a 1st, 2nd, 3rd, . . . , (m−1)-th, and m-th rows in order from a top in the figure. Similarly, to distinguish the columns from each other in the matrix of the data lines 214 and the pixel circuits 210, the columns may be referred to as a 1st, 2nd, 3rd, . . . , (n−1)-th, and (n)-th columns in order from a left in the figure.

In the liquid crystal panel 20, a Y driver 230 is provided on a periphery of the display region 200. The Y driver 230 selects the scanning line 212 in accordance with a control signal CtrY supplied via the FPC board 30, and sets a scanning signal to the selected scanning line 212 to an H level.

Note that, in the present exemplary embodiment, an example of the Y driver 230 will be described later, however, in a certain subframe, two rows of an odd-numbered row and an even-numbered row that is adjacent to the odd-numbered row in the Y direction may be selected in order, in another subframe, only odd-numbered rows may be selected in order one at a time, and in still another subframe, only even-numbered rows may be selected in order one at a time.

In addition, the liquid crystal panel 20, a demultiplexer 240 is provided on the periphery of the display region 200. In the present exemplary embodiment, the demultiplexer 240 distributes one system of data signals to, for example, the data lines 214 in four columns. A control signal Sel specifies which data line 214 of the data lines 214 in the four columns is selected, and whether a data signal is distributed to the selected data line 214. Note that, in the present exemplary embodiment, an example of the demultiplexer 240 will be described later, however, in a certain subframe, two columns of an odd-numbered column and an even-numbered column that is adjacent to the odd-numbered column in the X direction may be selected in order, in another subframe, only odd-numbered columns may be selected in order one at a time, and in still another subframe, only even-numbered columns may be selected in order one at a time.

Details of the pixel circuit 210 are not specifically described, but in the pixel circuit 210 corresponding to the selected scanning line 212 and corresponding to the selected data line 214, a voltage of a data signal distributed to the data line 214 is provided and retained. A liquid crystal element included in the pixel circuit 210 has a transmittance corresponding to an effective value of the retained voltage. Note that, in the pixel circuit 210 corresponding to the scanning line 212 not selected or the data line 214 not selected, a previously provided voltage is retained without being reprovided, and a transmittance of a liquid crystal element is maintained.

As illustrated in FIG. 2, the liquid crystal panel 20 is housed in a frame-shaped case 22 that opens in the display region 200.

One end of the FPC board 30 is connected to the liquid crystal panel 20. Another end of the FPC board 30 is connected to the processing circuit board 40 as illustrated in FIG. 1. An X driver 300 being a semiconductor integrated circuit is mounted to the FPC board 30 by face down bonding.

The X driver 300 converts processing data Dt supplied from the processing circuit board 40 into an analog data signal, and supplies the data signal to the demultiplexer 240 in accordance with the control signal Sel.

Figure 3:
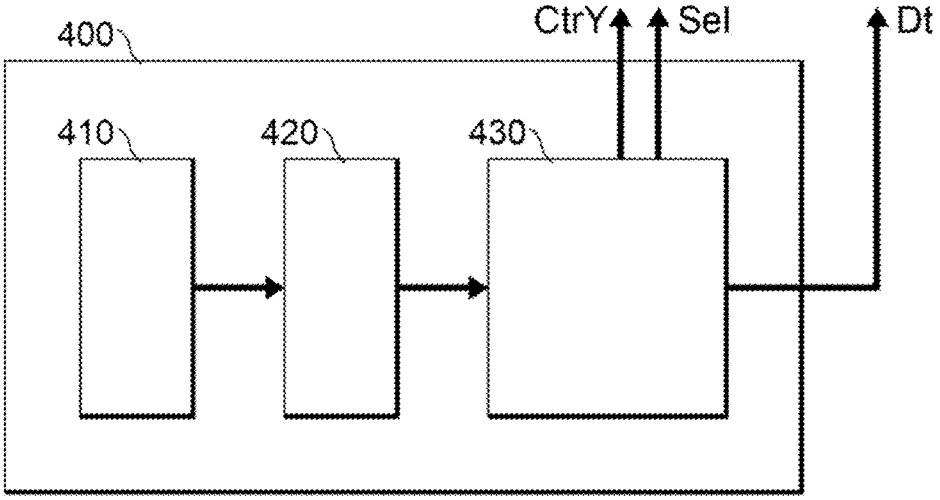
FIG. 3 is a block diagram illustrating a data processing unit in the display system.

The processing circuit board 40 is provided with a data processing unit 400. FIG. 3 is a block diagram illustrating a configuration of the data processing unit 400. The data processing unit 400 includes a display data generating unit 410, a storage unit 420, and an arithmetic processing unit 430.

The display data generating unit 410 is, for example, a CG engine for generating an image with a computer, an image sensor for capturing an image, and the like, and outputs display data representing the image. Note that, CG is an abbreviation for Computer Graphics. Further, display data (sometimes referred to as an image signal) may be externally supplied, not only limited to display data output from the display data generating unit 410. Note that, the display data is digital data specifying a gray scale level of a pixel by, for example, eight bits. When a gray scale level is specified by eight bits, the gray scale level is specified in a range from "0" to "255" when represented in decimal values.

The storage unit 420 temporarily stores display data supplied from the display data generating unit 410, or externally supplied display data.

The arithmetic processing unit 430 computes a gray scale value level of a pixel specified by display data in accordance with a subframe, and outputs the gray scale value level to the liquid crystal panel 20 as the processing data Dt. Note that, the arithmetic processing unit 430, in accordance with the output of the processing data Dt, outputs the control signal CtrY to control the Y driver 230, and outputs the control signal Sel to control the demultiplexer 240.

In the present exemplary embodiment, description will be given while resolution of an image specified by display data and resolution in the liquid crystal panel 20 are set to be the same. Specifically, a pixel array of an image specified by display data is set to the same as an array of the pixel circuits 210 in the liquid crystal panel 20. For convenience of explanation, a pixel specified by display data is referred to as a display data pixel, and a pixel expressed by the pixel circuit 210 of the liquid crystal panel 20, that is, a pixel expressed with a transmittance of a liquid crystal element of the pixel circuit 210 is referred to as a panel pixel. A display data pixel and a panel pixel correspond in a one-to-one manner.

In the display system 1 according to the present exemplary embodiment, a single image to be displayed in the liquid crystal panel 20 is not expressed by a frame F, but is expressed using four subframes f1 to f4. Next, the subframes f1 to f4 will be described.

Figure 4:
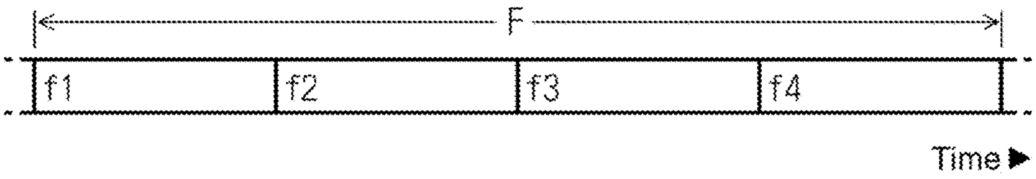
FIG. 4 is a diagram illustrating subframes in the display system.

FIG. 4 is a diagram for explaining a relationship between the frame and the sub-subframes in the display system 1 of the present exemplary embodiment. As illustrated in this figure, in this exemplary embodiment, one frame F is divided into the four subframes f1, f2, f3, and f4.

The frame F is a time period required to express a single image by the liquid crystal panel 20. When an image to be displayed on the liquid crystal panel 20 is specified by externally supplied display data, a time period length of the frame F is defined by a vertical synchronization signal of the display data. For example, when a frequency of the vertical synchronization signal is 60 Hz, the time period length of the frame F is 16.7 milliseconds, which is one cycle of the vertical synchronization signal. In this case, a time period length of each of the subframes f1 to f4 is 4.17 milliseconds.

The data processing unit 400 partitions display data pixels specified by display data of one frame into four display data pixels in two rows×two columns, performs predetermined processing on display data of the four display data pixels, and transmits the display data to the liquid crystal panel 20, as the processing data Dt in the four subframes f1 to f4.

In the liquid crystal panel 20, panel pixels are partitioned into four panel pixels in two rows×two columns, and in each of the subframes f1 to f4, a data signal based on the processing data Dt is supplied from the X driver 300 to a panel pixel corresponding to the selected scanning line 212 and the selected data line 214, among the four panel pixels.

For convenience of explanation, four display data pixels partitioned in two rows×two columns, or four panel pixels partitioned in two rows and two columns may be referred to as a block.

Figure 5:
FIG. 5 is a diagram illustrating a relationship between display data pixels and panel pixels.

FIG. 5 is a diagram illustrating a relationship between one block of display data pixels and panel pixels corresponding to the one block.

As illustrated in this figure, in one block of the display data pixels, a display data pixel on an upper left end (odd-numbered row/odd-numbered column) is A11, a display data pixel on an upper right end (odd-numbered row/even-numbered column) is A12, a display data pixel on a lower left end (even-numbered row/odd-numbered column) is A21, and a display data pixel on a lower right end (even-numbered row/even-numbered column) is A22.

Further, a gray scale level specified for the display data pixel A11 is dA11, a gray scale level specified for the display data pixel A12 is dA12, a gray scale level specified for the display data pixel A21 is dA21, and a gray scale level specified for the display data pixel A22 is dA22.

Of the four panel pixels corresponding to the one block, a panel pixel in odd-numbered row/odd-numbered column is a11, a panel pixel in odd-numbered row/even-numbered column is a12, a panel pixel in even-numbered row/odd-numbered column is a21, and a panel pixel in even-numbered row/even-numbered column is a22.

Additionally, a gray scale level specified for the panel pixel a11 is da11. Note that, the gray scale level da11 refers to a gray scale level specified by processing data output toward the panel pixel a11, of the processing data Dt output from the arithmetic processing unit 430. Similarly, a gray scale level of a data signal supplied to the panel pixel a12 is da12, a gray scale level of a data signal supplied to the panel pixel a21 is da21, and a gray scale level of a data signal supplied to the panel pixel a22 is da22.

Figure 6:
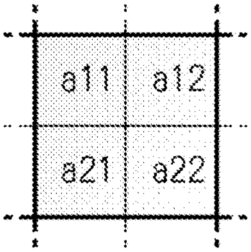
FIG. 6 is a diagram illustrating a relationship among data signals provided to the panel pixels.
Figure 6:
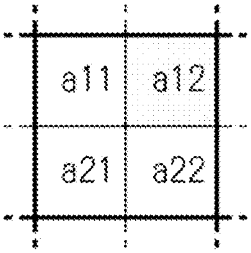
Figure 6:
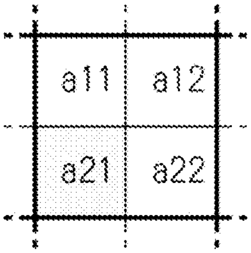
Figure 6:
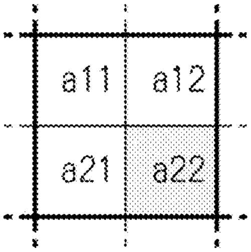

FIG. 6 is a diagram illustrating operation contents in the first exemplary embodiment. Specifically, FIG. 6 is a diagram illustrating, when any one block in display data pixels and panel pixels is focused on, how a gray scale level of processing data is calculated and supplied to which panel pixel, in the focused one block of the panel pixels.

First, in the subframe f1, the arithmetic processing unit 430 uses gray scale levels of respective four display data pixels constituting the block, and calculates gray scale levels to be supplied to the respective four panel pixels constituting the block using Equation (1) below.

$$da11,da12,da21,da22=\min(dA11,dA12,dA21,dA22) \quad (1)$$

Note that, in Equation (1), min is a function that outputs a minimum value of gray scale levels of display data included in parentheses.

Next, the arithmetic processing unit 430 controls the Y driver 230, the X driver 300, and the demultiplexer 240 so that a data signal corresponding to the minimum gray scale level is provided to the four panel pixels constituting the block.

Specifically, first, the arithmetic processing unit 430 transmits display data having the minimum gray scale level in the block to the X driver 300 as the processing data Dt.

Second, the arithmetic processing unit 430, in the subframe f1, causes the Y driver 230 to pair two rows of an odd-numbered row and an even-numbered row and select the pair in order, and causes the demultiplexer 240, in a time period in which the two rows are selected, to pair two columns of an odd-numbered column and an even-numbered column, and select the pair.

Third, when two rows×two columns of a corresponding block are selected, the arithmetic processing unit 430 causes the X driver 300 to convert processing data having a minimum gray scale level in the block to analog, and output the processing data as a data signal.

As a result, in the panel pixels a11, a12, a21, and a22 in the block, the data signal corresponding to the minimum gray scale level is provided, and thus the four panel pixels have a transmittance corresponding to a voltage of the data signal.

In a right section of FIG. 6, a hatched panel pixel indicates a panel pixel to which a data signal is to be provided.

Next, in the subframe f2, the arithmetic processing unit 430 uses the gray scale levels of the respective four display data pixels constituting the block to calculate the gray scale level da12 of the panel pixel a12 using Equation (2) below.

$$da12=dA11+(dA12+dA11-\min(dA11,dA12,dA21,dA22)\times 2)\times 1/3 \quad (2)$$

The gray scale level to be expressed by the panel pixels a12 is the gray scale level dA12 specified by the display data, but the data signal corresponding to the minimum gray scale level of the four display data pixels is provided to the panel pixel a12, in the subframe f1. Thus, in the subsequent subframes f2 to f4, processing is performed such that, by expressing with the gray scale level da12 calculated by Equation (2), the gray scale level da12 approaches the gray scale level dA12 throughout the frame F.

The arithmetic processing unit 430 controls the Y driver 230, the X driver 300, and the demultiplexer 240 such that a data signal corresponding to the gray scale level da12 calculated by Equation (2) is provided to the panel pixel a12 of the block.

Specifically, first, the arithmetic processing unit 430 transmits data of the calculated gray scale level da12 to the X driver 300 as the processing data Dt.

Second, the arithmetic processing unit 430 causes the Y driver 230 to select odd-numbered rows in order in the subframe f2, and causes the demultiplexer 240 to select an even-numbered column in a time period in which the odd-numbered row in one row is selected.

Third, when an odd-numbered row of the block is selected, the arithmetic processing unit 430 causes the X driver 300 to convert the processing data of the gray scale level da12 calculated in the block to analog, and output the processing data as a data signal. As a result, in the panel pixel a12 in the block, the data signal corresponding to the calculated gray scale level da12 is provided, and thus the panel pixel a12 has a transmittance in accordance with a voltage of the data signal.

Note that, the panel pixels a11, a21, and a22 each maintain, in the subframe f2, the transmittance in accordance with the voltage of the data signal provided in the subframe f1.

In the subframe f3, the arithmetic processing unit 430 uses the gray scale levels of the respective four display data pixels constituting the block to calculate the gray scale level da21 of the panel pixel a21 using Equation (3) below.

$$da21=dA21+(dA21-\min(dA11,dA12,dA21,dA22)) \quad (3)$$

The gray scale level da21 to be expressed by the panel pixels a21 is the gray scale level dA21 specified by the display data, but a data signal corresponding to the minimum gray scale level of the four display data pixels is provided to the panel pixel a21, in the subframe f1, and the data signal is also maintained in the subframe f2. Thus, in the subsequent subframes f3 and f4, processing is performed such that, by expressing the panel pixel a21 with the gray scale level da21 calculated by Equation (3), the gray scale level da21 approaches the gray scale level dA21 throughout the frame F.

The arithmetic processing unit 430 controls the Y driver 230, the X driver 300, and the demultiplexer 240 such that a data signal corresponding to the gray scale level da21 calculated by Equation (3) is provided to the panel pixel a21 of the block.

Specifically, first, the arithmetic processing unit 430 transmits data of the calculated gray scale level da21 to the X driver 300 as the processing data Dt.

Second, the arithmetic processing unit 430 causes the Y driver 230 to select even-numbered rows in order in the subframe f3, and causes the demultiplexer 240 to select an odd-numbered column in a time period in which the even-numbered row in one row is selected.

Third, when an even-numbered row of a corresponding block is selected, the arithmetic processing unit 430 causes the X driver 300 to convert the processing data of the gray scale level da21 calculated in the block to analog, and output the processing data as a data signal.

As a result, in the panel pixel a21 in the block, the data signal corresponding to the calculated gray scale level da21 is provided, and thus the panel pixel a21 has a transmittance in accordance with a voltage of the data signal.

Note that, the panel pixels a11 and a22 each maintain, in the subframe f3, the transmittance in accordance with the voltage of the data signal provided in the subframe f1. Note that, the panel pixel a12 maintains, in the subframe f3, the transmittance in accordance with the voltage of the data signal provided in the subframe f2.

In the subframe f4, the arithmetic processing unit 430 uses the gray scale levels of the respective four display data pixels constituting the block to calculate the gray scale level da22 to be supplied to the panel pixel a22 using Equation (4) below.

$$da22=dA22+(dA22-\min(dA11,dA12,dA21,dA22))\times 3 \quad (4)$$

A gray scale level to be expressed by the panel pixels a22 is the gray scale level dA22 specified by the display data, but a data signal corresponding to the minimum gray scale level of the four display data pixels is provided to the panel pixel a22, in the subframe f1, and the data signal is also maintained in the subframes f2 and f3. In this subsequent subframe f4, processing is performed such that, by expressing the panel pixel a22 with the gray scale level calculated by Equation (4), the gray scale level approaches the gray scale level dA22 throughout the frame F.

The arithmetic processing unit 430 controls the Y driver 230, the X driver 300, and the demultiplexer 240 such that a data signal corresponding to the gray scale level da22 calculated by Equation (4) is provided to the panel pixels a22 of the block.

Specifically, first, the arithmetic processing unit 430 transmits data of the calculated gray scale level da22 to the X driver 300 as the processing data Dt.

Second, the arithmetic processing unit 430 causes the Y driver 230 to select even-numbered rows in order in the subframe f4, and causes the demultiplexer 240 to select an even-numbered column in a time period in which the even-numbered row in one row is selected.

Third, when an even-numbered row of the block is selected, the arithmetic processing unit 430 causes the X driver 300 to output the processing data having the gray scale level da22 calculated in the block, as a data signal converted to analog.

As a result, in the panel pixel a22 in the block, the data signal corresponding to the calculated gray scale level da22 is provided, and thus the panel pixel a22 has a transmittance in accordance with a voltage of the data signal.

Note that, the panel pixel a11 maintains, in the subframes f2 to f4, the transmittance in accordance with the voltage of the data signal provided in the subframe f1. Further, the panel pixel a12 maintains, in the subframe f3 and f4, the transmittance in accordance with the voltage of the data signal provided in the subframe f2, and the panel pixel a21 maintains, in the subframe f4, the transmittance in accordance with the voltage of the data signal provided in the subframe f3.

Figure 7:
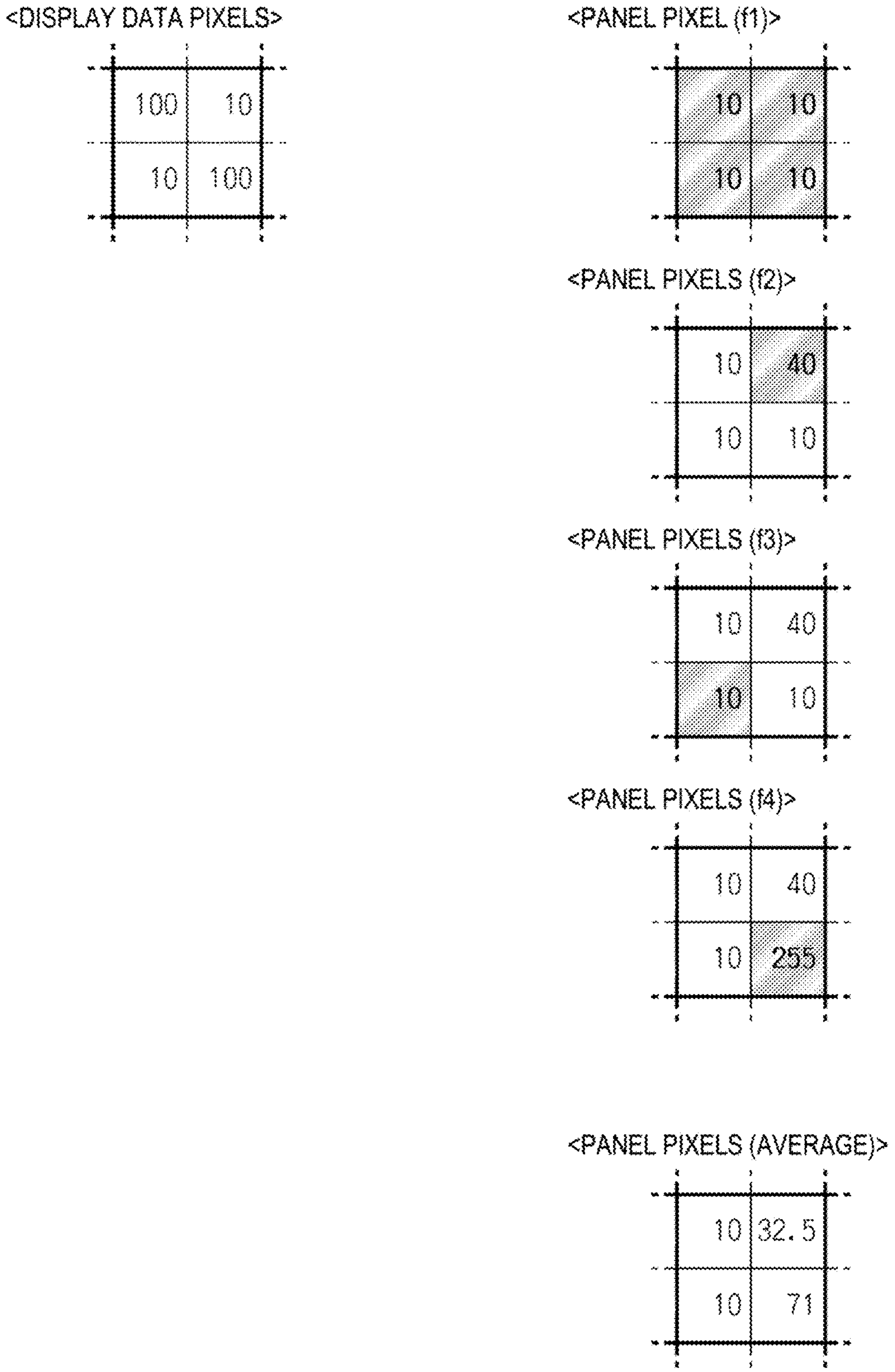
FIG. 7 is an example illustrating a relationship between the display data pixels and gray scale levels of the panel pixels.

FIG. 7 is a diagram illustrating an example of gray scale levels of respective display data pixels, and gray scale levels of data signal supplied to panel pixels.

In this FIG. 7, a case is assumed in which, in a certain frame F, among gray scale levels of respective four display data pixels constituting one block, the gray scale levels dA11 and dA22 are decimal value "100", and the gray scale levels dA12 and dA21 are "10".

In the subframe f1 of the frame F, a data signal corresponding to a minimum gray scale level of "10" is provided to the four panel pixels a11, a12, a21, and a22 of the block, in accordance with Equation (1).

In the subframe f2, a data signal corresponding to a gray scale level "40" is provided to the panel pixels a12 of the block in accordance with Equation (2). In the subframe f2, the panel pixels a11, a21, and a22 retain the data signal corresponding to the gray scale level "10" provided in the subframe f1.

In the subframe f3, a data signal corresponding to a gray scale level "10" is provided to the panel pixel a21 of the block in accordance with Equation (3). In the subframe f3, the panel pixels a11 and a22 retain the data signal corresponding to the gray scale level "10" provided in the subframe f1, and the panel pixel a12 retains a data signal corresponding to a gray scale level "40" provided in the subframe f2.

In the subframe f4, a data signal corresponding to a gray scale level "255" is provided to the panel pixel a22 of the block in accordance with Equation (4).

Note that, strictly speaking, in accordance with Equation (4), the gray scale level of the panel pixel a22 is "370", but exceeds a highest value "255" in eight bits, thus the highest value "255" is used here.

In the subframe f4, the panel pixel a11 retains the data signal corresponding to the gray scale level "10" provided in the subframe f1, and the panel pixel a12 retains the data signal corresponding to the gray scale level "40" provided in the subframe f2, and the panel pixel a21 retains the data signal corresponding to the gray scale level "10" provided in the subframe f3.

Note that, although the freely selected one block has been described here, the same applies to the other blocks. Specifically, display data pixels and panel pixels arrayed in m rows and n columns are divided into blocks in units of two rows and two columns. In the subframe f1, from the scanning lines 212, for example, two rows of an odd-numbered row and even-numbered row are selected at a time, such as, 1st and 2nd rows, 3rd and 4th rows, . . . , (m−1)-th and m-th rows, and in a time period in which the scanning lines 212 in the two rows are selected, from the data lines 214, an odd-numbered column and an even-numbered column are selected at the same time, such as 1st and 2nd columns, 3rd and 4th columns, . . . , (n−1)-th and n-th columns. To the selected data line 214, a data signal corresponding to a minimum gray scale level is supplied in a block corresponding to the scanning lines in the selected two rows and the data lines in the selected two columns.

Next, in the subframe f2, from the scanning lines 212, odd-numbered rows are selected one row at a time, such as, a 1st row, 3rd row, . . . , and (m−1)-th row, and in a time period in which the scanning line 212 in the one row is selected, from the data lines 214, even-numbered columns are selected, such as a 2nd column, 4th column, . . . , and n-th column. To the selected data line 214, a data signal corresponding to the gray scale level determined by Equation (2) is supplied in a block corresponding to the scanning lines in the selected row and the data line in the selected column.

In the subframe f3, from the scanning lines 212, for example, even-numbered rows are selected one row at a time, such as, a 2nd row, 4th row, . . . , and m-th row, and in a time period in which the scanning line 212 in the one row is selected, from the data lines 214, odd-numbered columns are selected, such as a 1st column, 3rd column, . . . , and (n−1)-th column. To the selected data line 214, a data signal corresponding to the gray scale level determined by Equation (3) is supplied in a block corresponding to the scanning line in the selected row and the data line in the selected column.

In the subframe f4, from the scanning lines 212, for example, even-numbered rows are selected one row at a time, such as, a 2nd row, 4th row, . . . , and m-th row, and in a time period in which the scanning line 212 in the one row is selected, from the data lines 214, even-numbered columns are selected, such as a 2nd column, 4th column, . . . , and n-th column. To the selected data line 214, a data signal corresponding to the gray scale level determined by Equation (4) is supplied in a block corresponding to the scanning line in the selected row and the data line in the selected column.

In this manner, the same providing is performed in other blocks in the subframes f1 to f4.

Figure 8:
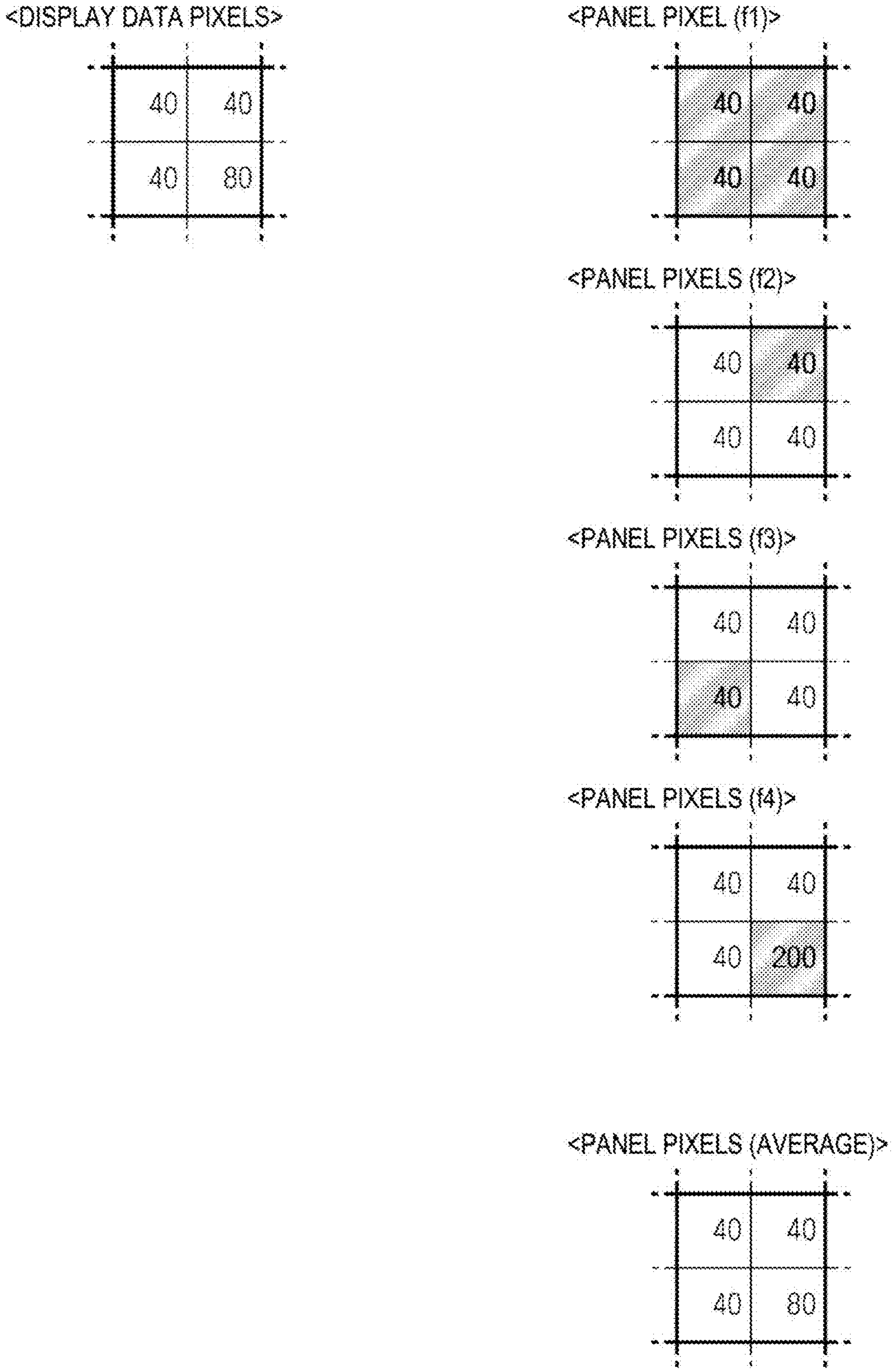
FIG. 8 is another example illustrating the relationship between the display data pixels and the gray scale levels of the panel pixels.

FIG. 8 is a diagram illustrating another example of gray scale levels of respective display data pixels, and gray scale levels of data signals supplied to panel pixels.

In this FIG. 8, a case is assumed in which, in a certain frame F, among gray scale levels of respective four display data pixels constituting one block, the gray scale levels dA11, dA12, and dA21 are decimal value "40", and the gray scale level dA22 is "80".

In the subframe f1 of the frame F, a data signal corresponding to a minimum value "10" is provided to the panel pixels a11, a12, a21, and a22, in accordance with Equation (1). In the subframe f2, a data signal corresponding to a gray scale level "40" is provided to the panel pixels a12 of the block in accordance with Equation (2). In the subframe f3, a data signal corresponding to a gray scale level "40" is provided to the panel pixel a21 of the block in accordance with Equation (3). In the subframe f4, a data signal corresponding to a gray scale level "200" is provided to the panel pixel a22 of the block in accordance with Equation (4).

Figure 9:
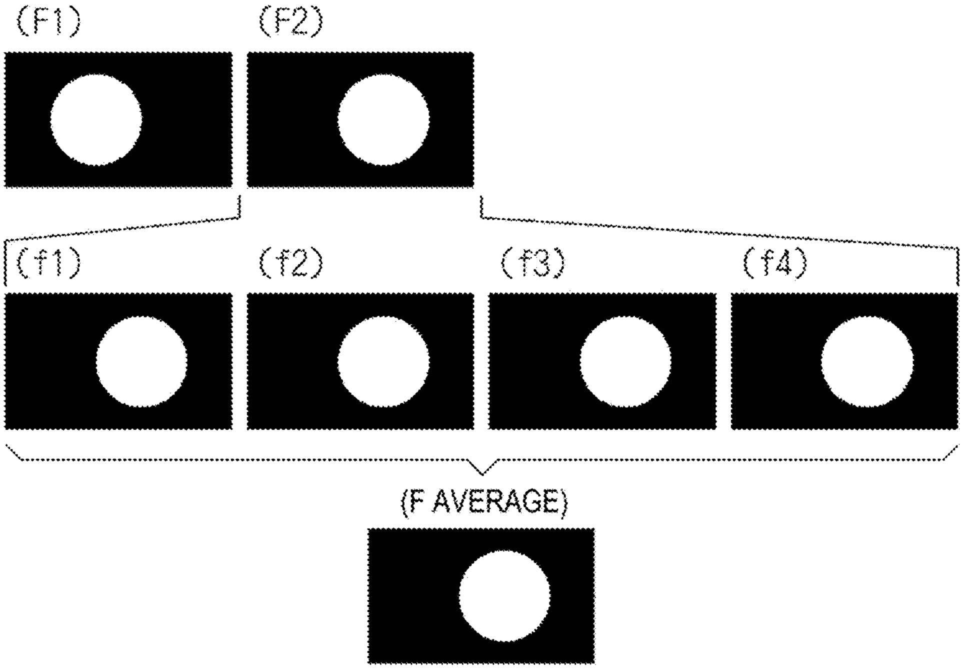
FIG. 9 is a diagram illustrating an example of display in subframes f1 to f4 in the first exemplary embodiment.

FIG. 9 is a diagram for explaining a delay in the display panel in the present exemplary embodiment.

When an image in a first frame F1 and an image in a second frame F2 represented by display data are as illustrated in the figure, in the present exemplary embodiment, display data representing an image of one frame is divided into blocks of display data pixels in two rows and two columns, and in the subframe f1, display data having a minimum gray scale level in the block is supplied to four panel pixels corresponding to the block.

Thus, when resolution of an image to be displayed is, for example, m rows and n columns, processing data output from the data processing unit 400 toward the liquid crystal panel 20 is in (m/2) rows and (n/2) columns, and is ¼ of m rows and n columns. Thus, in the present exemplary embodiment, for a time period for completing transfer of the processing data to the liquid crystal panel 20, compared to a case of transferring display data in m rows and n columns, ¼ is enough.

In the present exemplary embodiment, an image displayed on the liquid crystal panel 20 in the subframe f1 is an image obtained by dividing the resolution of the display data into blocks in two rows and two columns, that is, with resolution halved vertically and horizontally, and is an image having a minimum gray scale value, among four display data pixels included in the block. In the subframe f2, a data signal processed to approach the gray scale level dA12 of the display data is provided to the panel pixel a12. In the subframe f3, a data signal processed to approach the gray scale level dA21 of the display data is provided to the panel pixel a21. In addition, in the subframe f4, a data signal processed to approach the gray scale level dA21 of the display data is provided to the panel pixel a22.

Thus, when viewed through the subframes f1 to f4, the panel pixels a11, a12, a21, and a22 are close to the gray scale levels dA11, dA12, dA21, and dA22 of the display data, respectively, and an image close to an intended image is displayed. For example, when the gray scale levels of the respective display data pixels are illustrated in FIG. 8, and viewed through the subframes f1 to f4, that is, when viewed with an average of one frame F, the gray scale levels expressed by the panel pixels a11, a12, a21, and a22 may be the gray scale levels dA11, dA12, dA21, and dA22 of the display data, respectively.

Figure 24:
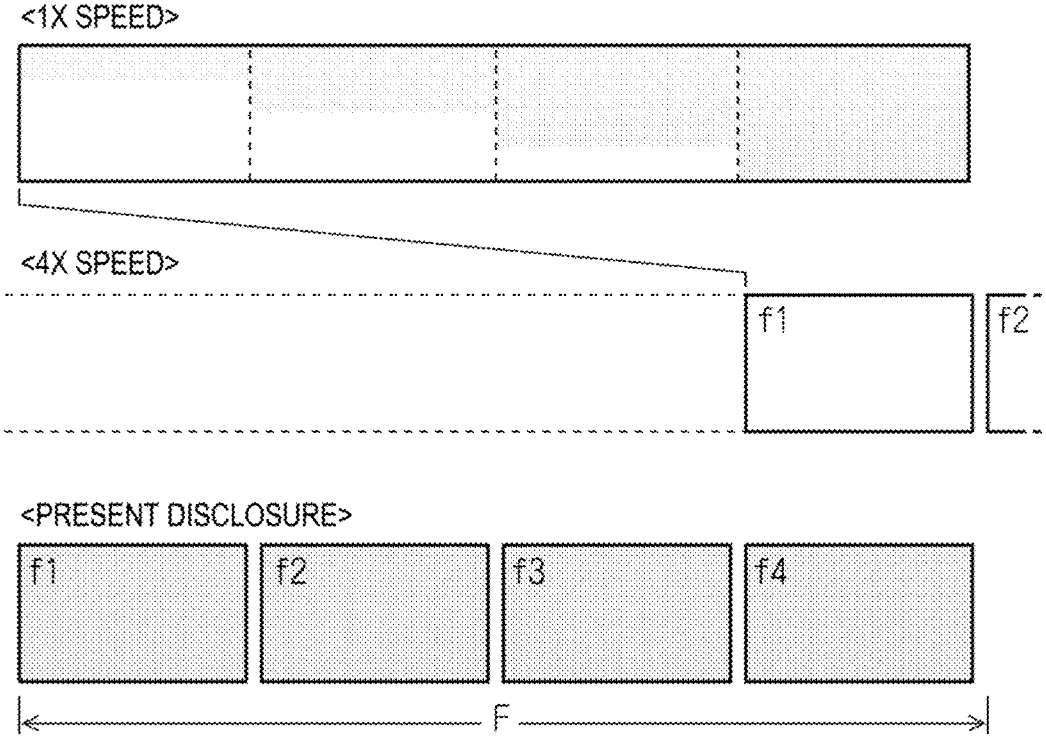
FIG. 24 is a diagram illustrating a comparison between a contrast example and the first exemplary embodiment.

In addition, when the liquid crystal panel 20 is driven at 4× speed with display data having a vertical synchronization frequency of 60 Hz supplied from an upper device, as illustrated in FIG. 24, the driving of the liquid crystal panel 20 overtakes the display data, unless the driving of the liquid crystal panel 20 is started from a point of time at which ¾ of the display data of one frame is supplied to the data processing unit 400. Thus, the display on the liquid crystal panel 20 is delayed by 1/80 seconds ((=1/60 Hz)×(¾)) with respect to the display data.

Although not illustrated in particular, when the liquid crystal panel 20 is driven at 2× speed with display data having a vertical synchronization frequency of 60 Hz, since it is necessary to start the driving of the liquid crystal panel 20 from a point of time at which ½ of the display data of one frame is supplied to the data processing unit 400, the display on the liquid crystal panel 20 is delayed by 1/120 seconds ((=1/60 Hz)×(½)) with respect to the display data.

In recent years, as in Esports, a delay of display with respect to an operation is likely to matter. As with the liquid crystal panel 20, in so-called hold-type display elements, displaying rapid motion is difficult. Thus, by doubling a drive frequency, such as driving at 2× speed and 4× speed, and generating (complementing) an intermediate image between frames, even an image with rapid motion is displayed smoothly in some times.

Figure 10:
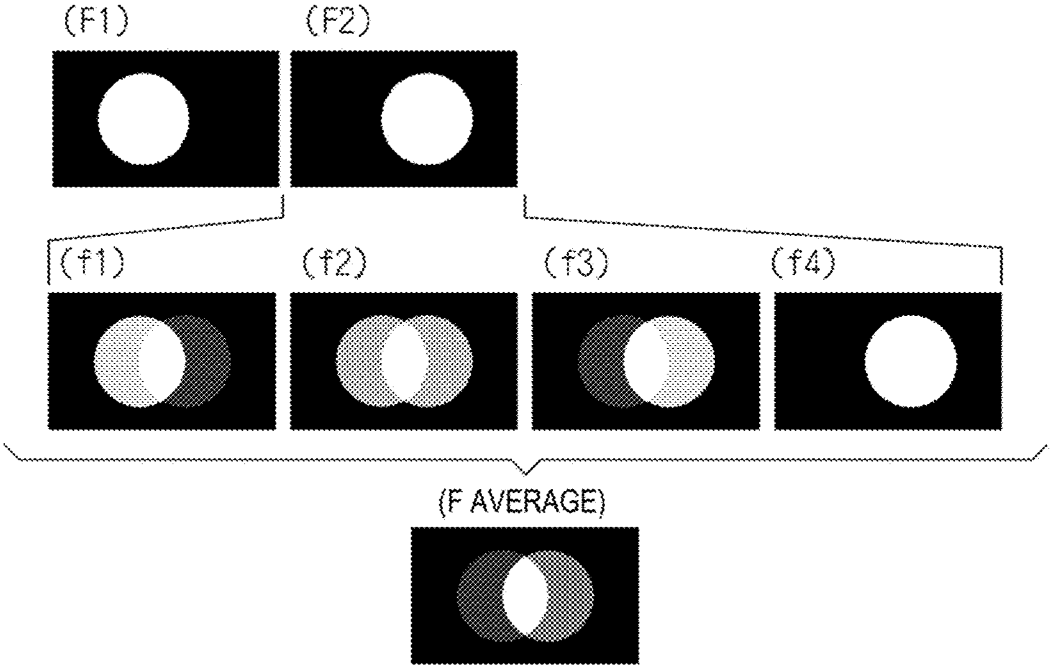
FIG. 10 is a diagram illustrating an example of display in the subframes f1 to f4 in a comparative example.

However, for example, when the liquid crystal panel 20 is driven at 4× speed, and an image in the first frame F1 and an image in the second frame F2 are illustrated in FIG. 10, intermediate images for the subframes f1 to f3 are created, and an image in the second frame F2 is displayed on the liquid crystal panel 20 in the last subframe f4, an average image viewed through the one frame F is as illustrated in the figure, and damage to an actual appearance occurs.

In contrast, in the present exemplary embodiment, for the image in the second frame F2, it is sufficient to supply ¼ of processing data to the liquid crystal panel 20 in the subframe f1, and thus delay is small. In addition, in the present exemplary embodiment, the average image obtained by viewing the images displayed in the subframes f1 to f4 on the liquid crystal panel 20 through the one frame F is as illustrated in FIG. 9, and damage to the actual appearance can be reduced compared to FIG. 10.

Second Exemplary Embodiment

In the first exemplary embodiment, in the subframe f1, of four display data pixels constituting a block, a data signal corresponding to a minimum gray scale level is supplied to four panel pixels in the block. The data signal supplied to the four panel pixels in the subframe f1 may be set to other than the minimum gray scale level among the four display data pixels constituting the block.

Thus, a second exemplary embodiment will be explained in which, in the subframe f1, a data signal supplied to four panel pixels constituting a block is set to other than a minimum gray scale level, among display data pixels of the block.

Figure 11:
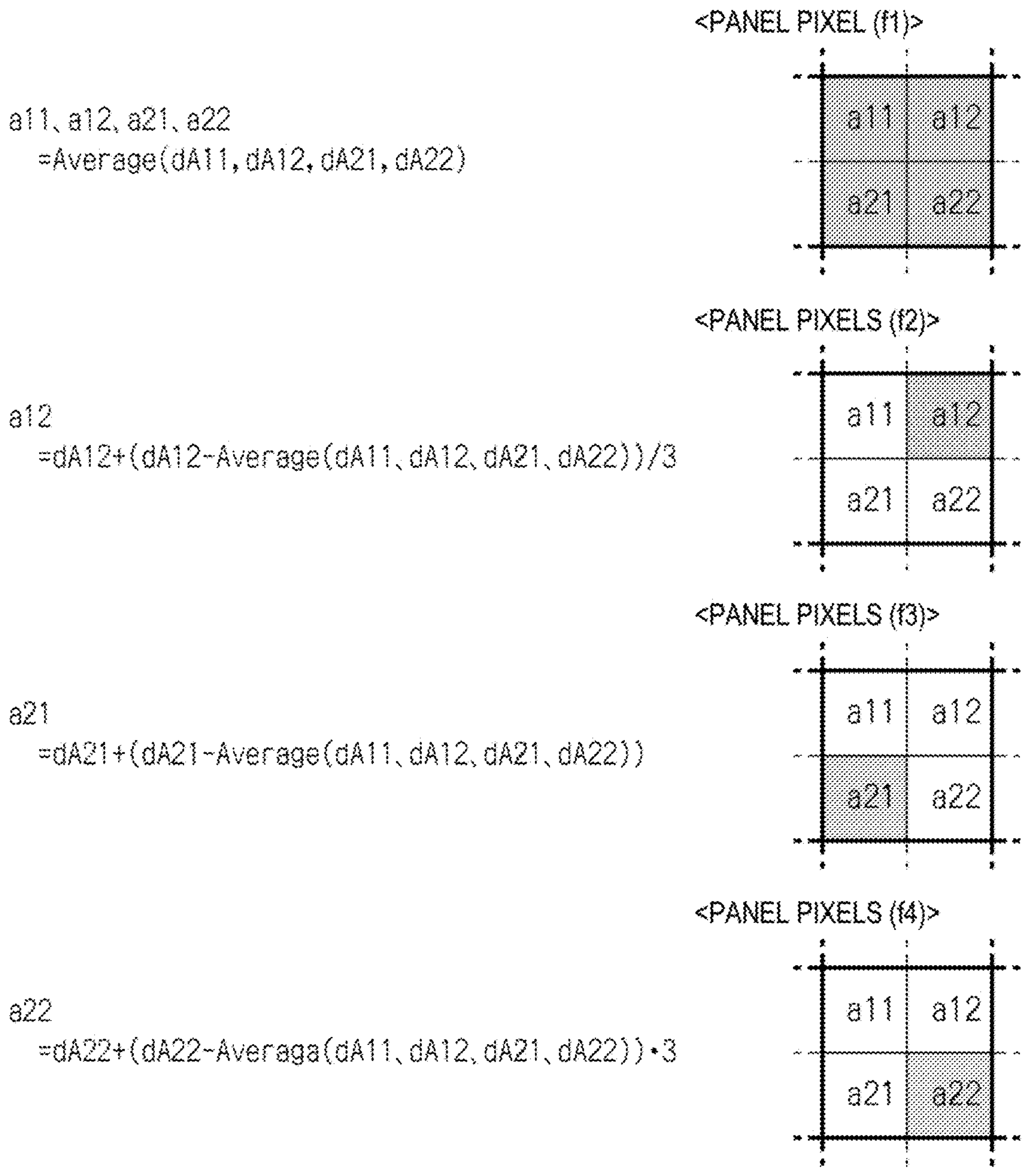
FIG. 11 is a diagram illustrating a relationship among data signals provided to panel pixels in a second exemplary embodiment.

FIG. 11 is a diagram illustrating operation contents in the second exemplary embodiment. Specifically, FIG. 11 is a diagram illustrating, when any one block in display data pixels and panel pixels is focused on, how a gray scale level of display data is calculated and supplied to which panel pixel, in the focused one block of the panel pixels.

First, in the subframe f1, the arithmetic processing unit 430 uses gray scale levels of respective four display data pixels constituting the block, and calculates gray scale levels to be supplied to the respective four panel pixels constituting the block using Equation (5) below.

$$da11, da12, da21, da22 = \text{Average}(dA11, dA12, dA21, dA22) \tag{5}$$

Note that in equation (5), Average is a function of outputting an average value of gray scale levels of display data included in parentheses.

Next, the arithmetic processing unit 430 controls the Y driver 230, the X driver 300, and the demultiplexer 240 so that a data signal corresponding to the average gray scale level is provided to the four panel pixels constituting the block. Specific control contents are common to those in the subframe f1 in the first exemplary embodiment.

Next, in the subframe f2, the arithmetic processing unit 430 uses the gray scale levels of the respective four display data pixels constituting the block to calculate the gray scale level da12 of the panel pixel a12 using Equation (6) below.

$$da12 = dA12 + (dA12 - \text{Average}(dA11, dA12, dA21, dA22) \times 2) \times 1/3 \tag{6}$$

The gray scale level to be expressed by the panel pixel a12 is the gray scale level dA12 specified by the display data, but the data signal corresponding to the average gray scale level of the four display data pixels is provided to the panel pixel a12, in the subframe f1. Thus, in the subsequent subframes f2 to f4, processing is performed such that, by expressing with the gray scale level da12 calculated by Equation (6), the gray scale level da12 approaches the gray scale level dA12 throughout the frame F.

The arithmetic processing unit 430 controls the Y driver 230, the X driver 300, and the demultiplexer 240 such that a data signal corresponding to the gray scale level da12 calculated by Equation (6) is provided to the panel pixel a12 of the block. Specific control content is common to that of the subframe f2 in the first exemplary embodiment.

In the subframe f3, the arithmetic processing unit 430 uses the gray scale levels of the respective four display data pixels constituting the block to calculate the gray scale level da21 of the panel pixel a21 using Equation (7) below.

$$da21 = dA21 + (dA21 - \text{Average}(dA11, dA12, dA21, dA22)) \tag{7}$$

The gray scale level da21 to be expressed by the panel pixel a21 is the gray scale level dA21 specified by the display data, but a data signal corresponding to the average gray scale level of the four display data pixels is provided to the panel pixel a21, in the subframe f1, and the data signal is also maintained in the subframe f2. Thus, in the subsequent subframes f3 and f4, processing is performed such that, by expressing the panel pixel a21 with the gray scale level da21 calculated by Equation (7), the gray scale level da21 approaches the gray scale level dA21 throughout the frame F.

The arithmetic processing unit 430 controls the Y driver 230, the X driver 300, and the demultiplexer 240 such that a data signal corresponding to the gray scale level da21 calculated by Equation (7) is provided to the panel pixel a21 of the block. Specific control content is common to that of the subframe f3 in the first exemplary embodiment.

In the subframe f4, the arithmetic processing unit 430 uses the gray scale levels of the respective four display data pixels constituting the block to calculate the gray scale level da22 to be supplied to the panel pixel a22 using Equation (8) below.

$$da22=dA22+(dA22-\text{Average}(dA11,dA12,dA21,dA22))\times 3 \quad (8)$$

A gray scale level to be expressed by the panel pixel a22 is the gray scale level dA22 specified by the display data, but a data signal corresponding to the average gray scale level of the four display data pixels is provided to the panel pixel a22, in the subframe f1, and the data signal is also maintained in the subframes f2 and f3. In this subsequent subframe f4, processing is performed such that, by expressing the panel pixel a22 with the gray scale level calculated by Equation (8), the gray scale level approaches the gray scale level dA22 throughout the frame F.

The arithmetic processing unit 430 controls the Y driver 230, the X driver 300, and the demultiplexer 240 such that a data signal corresponding to the gray scale level da22 calculated by Equation (8) is provided to the panel pixel a22 of the block. Specific control contents are common to those in the subframe f4 in the first exemplary embodiment.

Figure 12:
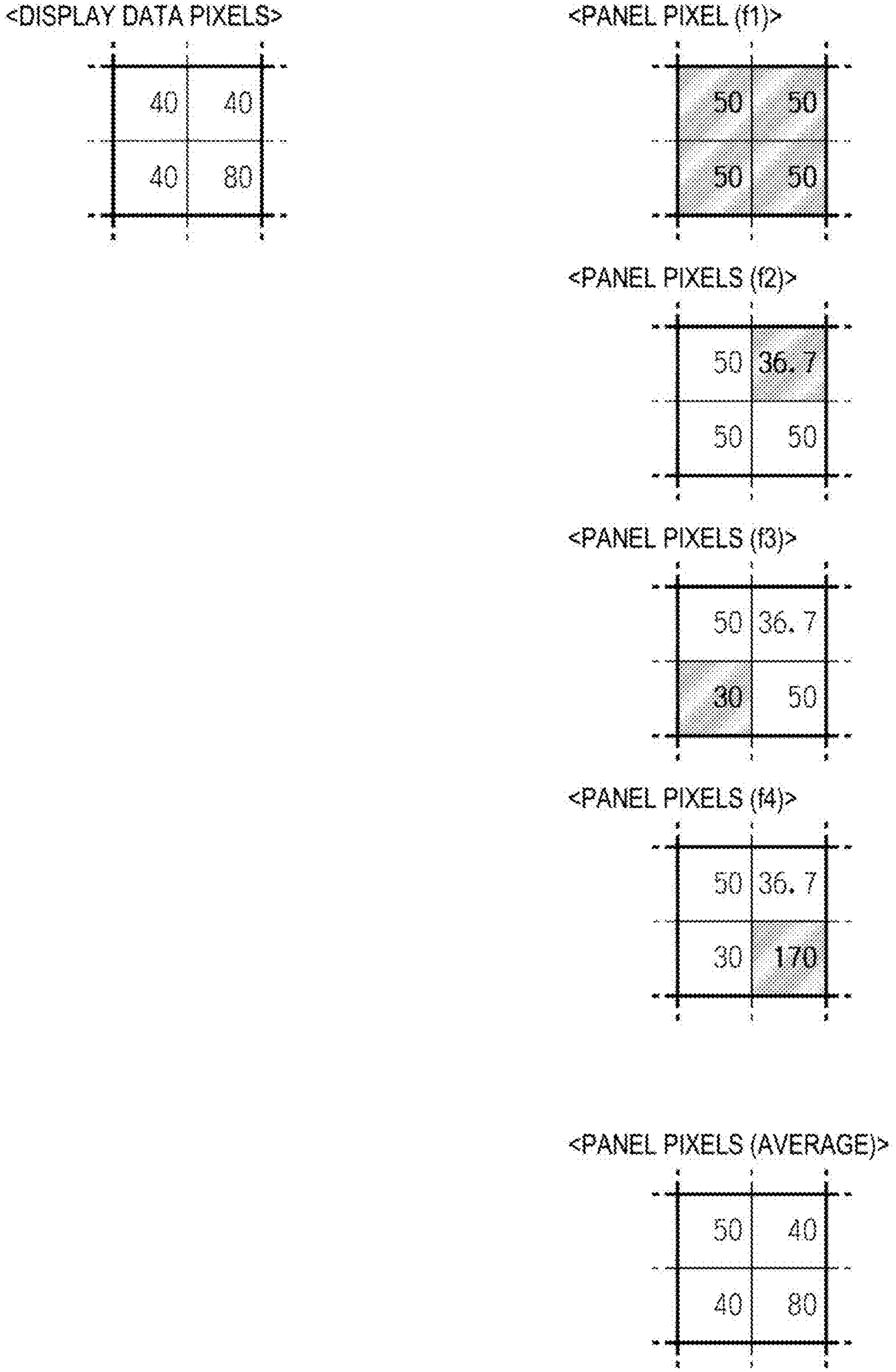
FIG. 12 is an example illustrating a relationship between display data pixels and gray scale levels of the panel pixels.

FIG. 12 is a diagram illustrating an example of gray scale levels of respective display data pixels, and gray scale levels of data signal supplied to panel pixels, in the second exemplary embodiment.

In this FIG. 12, similar to FIG. 8, a case is assumed in which, in a certain frame F, among gray scale levels of respective four display data pixels constituting one block, the gray scale levels dA11, dA12, and dA21 are decimal value "40", and the gray scale level dA22 is "80".

In the subframe f1 of the frame F, a data signal corresponding to an average value "50" is provided to the panel pixels a11, a12, a21, and a22, in accordance with Equation (5). In the subframe f2, a data signal corresponding to a gray scale level "36.7" is provided to the panel pixel a12 of the block in accordance with Equation (6). Note that, when a gray scale level is expressed as a decimal value, a decimal part is to be rounded off, but for convenience of explanation here, up to a first decimal place is displayed. In the subframe f3, a data signal corresponding to a gray scale level "30" is provided to the panel pixel a21 of the block in accordance with Equation (7). In the subframe f4, a data signal corresponding to a gray scale level "170" is provided to the panel pixel a22 of the block in accordance with Equation (8).

In the second exemplary embodiment, an average image obtained by viewing the images displayed in the subframes f1 to f4 on the liquid crystal panel 20 through one frame F is as illustrated in FIG. 12, and is similar to that of the first exemplary embodiment illustrated in FIG. 8.

In the second exemplary embodiment, compared to the first exemplary embodiment, an image displayed on the liquid crystal panel 20 in the subframe f1 is an average value of four display data pixels in a block, and is an image obtained by halving resolution of an image represented by display data vertically and horizontally. Accordingly, in the second exemplary embodiment, compared to the first exemplary embodiment, an image displayed in the subframe f1 can be made to approach an image represented by display data.

Further, the second exemplary embodiment is similar to the first exemplary embodiment in that there is small delay in an image displayed by the liquid crystal panel 20 with respect to display data, and in that there is little damage to an appearance of an average image obtained by viewing images displayed in the subframes f1 to f4 on the liquid crystal panel 20 through one frame F.

Third Exemplary Embodiment

In the first exemplary embodiment, a data signal corresponding to a minimum value of four pieces of display data constituting a block is provided to the panel pixel a22 in the subframe f1, and is retained in the subframes f2 and f3. In addition, in the second exemplary embodiment, a data signal corresponding to an average value of four pieces of display data constituting a block is provided to the panel pixel a22 in the subframe f1, and is retained in the subframes f2 and f3.

Thus, a data signal different from the gray scale level dA22 of the display data is provided to the panel pixels a22 in the subframe f1, and is retained in the subframes f2 and f3. Then, in the last subframe f4, a data signal of a gray scale level computed so as to be close to the gray scale level dA22 is provided to the panel pixel a22. In other words, a data signal of a gray scale level is provided to the panel pixels a22 in the subframe f4 so as to reduce an error to that point of time.

However, when the error is large, it may not be possible to absorb the error only by the data signal provided to the panel pixel a22 in the subframe f4.

For example, in the example illustrated in FIG. 7, in the subframe f4, the gray scale level of the panel pixel a22 is "370", but exceeds a highest value "255" of eight bits, and is replaced with the highest value "255", and separated "115" is ignored.

Accordingly, a third exemplary embodiment will be described in which the separation ignored in this way is reflected in a next frame.

Figure 13:
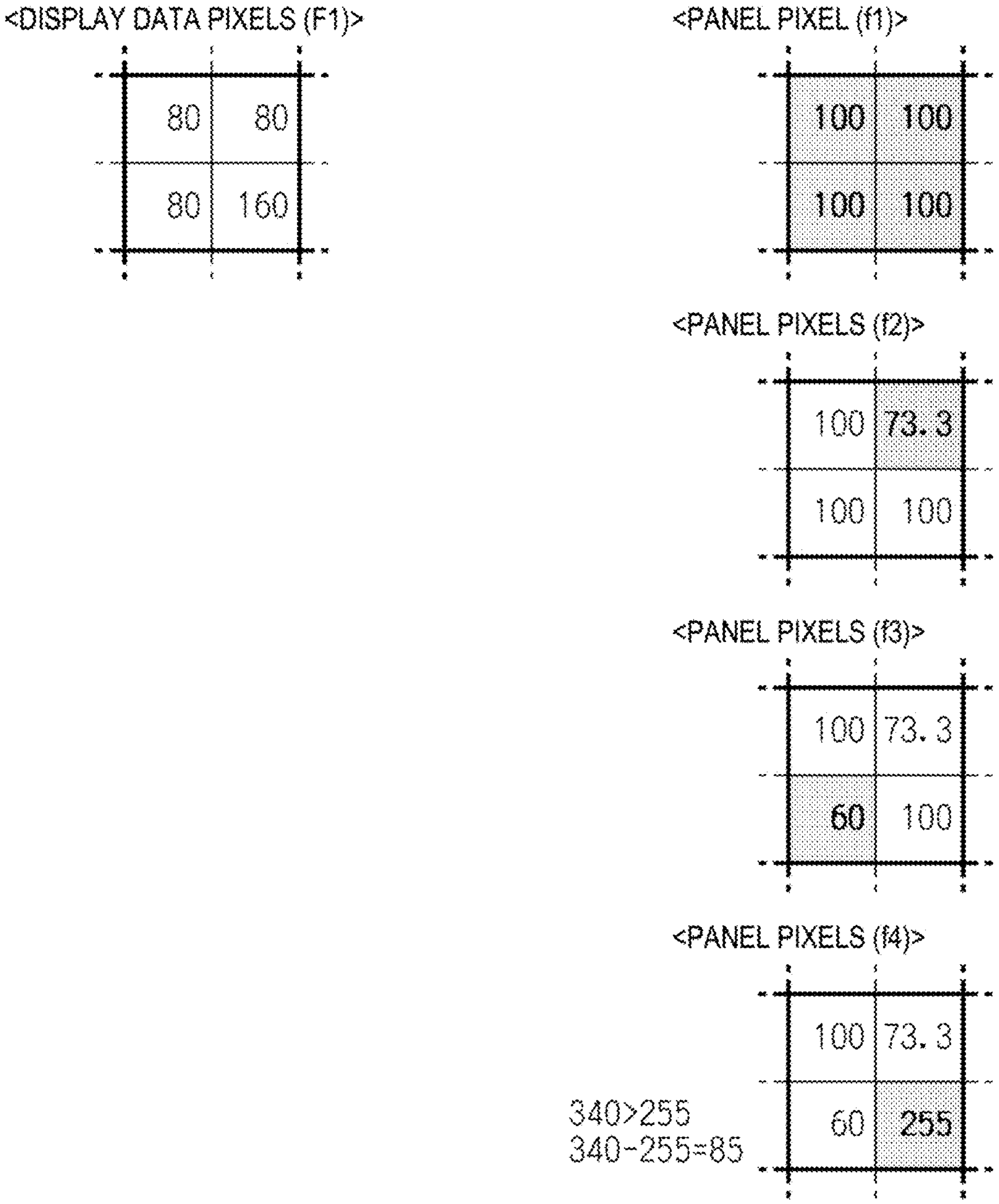
FIG. 13 is a diagram illustrating a relationship among data signals provided to panel pixels in a third exemplary embodiment.
Figure 14:
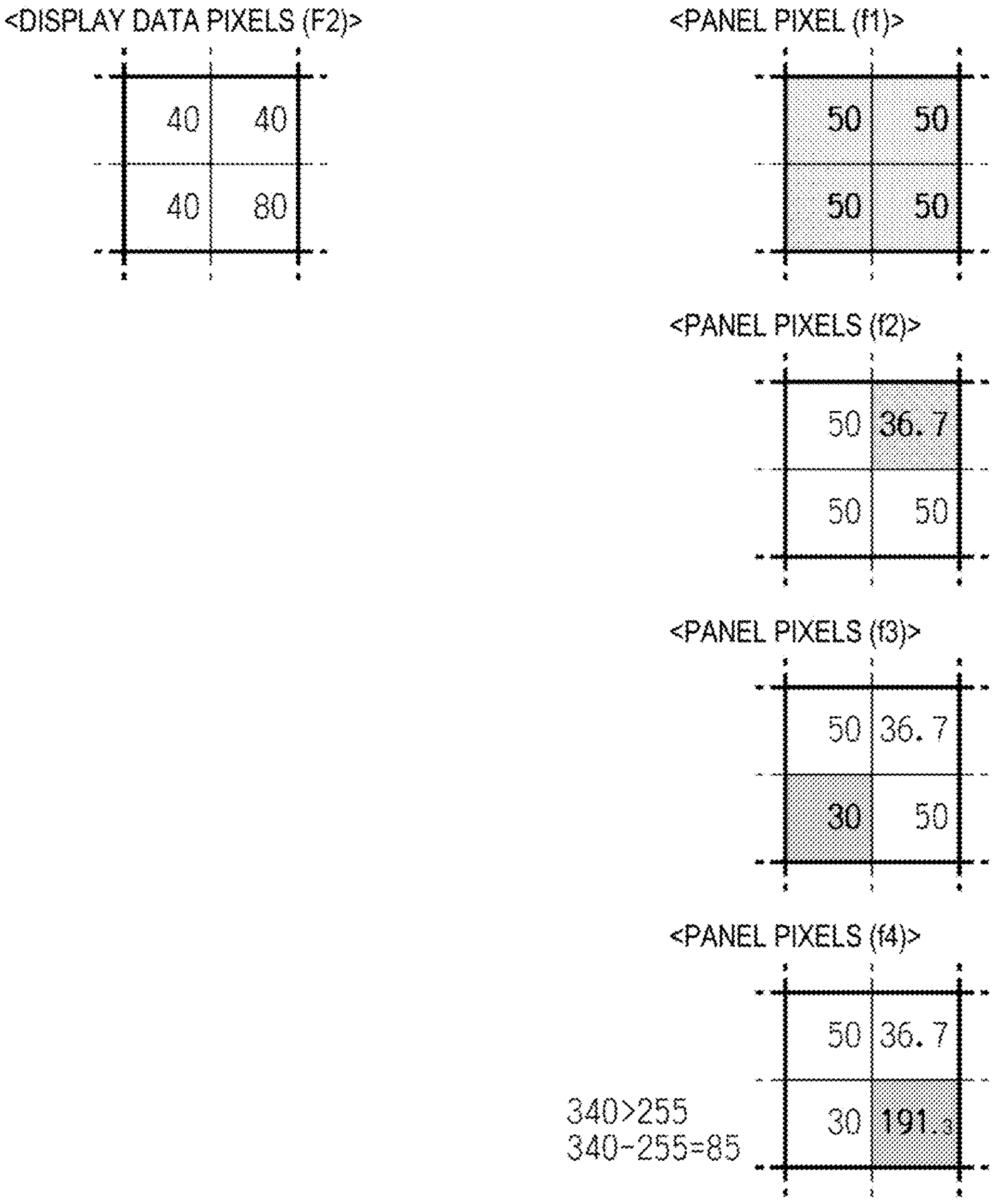
FIG. 14 is a diagram illustrating a relationship among data signals provided to panel pixels in a fourth exemplary embodiment.

FIG. 13 and FIG. 14 are diagrams illustrating operation contents in the third exemplary embodiment.

Specifically, FIG. 13 and FIG. 14 are diagrams each illustrating, when any one block in display data pixels and panel pixels is focused on, how a gray scale level of display data is calculated and supplied to which panel pixel, in the focused one block of the panel pixels. Of these, FIG. 13 illustrates the first frame F1, and FIG. 14 illustrates the second frame F2.

Note that, in the following description, the third exemplary embodiment will be described as an improvement to the second exemplary embodiment.

In this FIG. 13, a case is assumed in which, in a first frame F1, among gray scale levels of respective four display data pixels constituting one block, the gray scale levels dA11, dA12, and dA21 are decimal value "80", and the gray scale level dA22 is "160".

In the subframe f1 of the frame F1, a data signal corresponding to an average value "100" is provided to the panel pixels a11, a12, a21, and a22, in accordance with Equation (5). In the subframe f2, a data signal corresponding to a gray scale level "73.3" is provided to the panel pixels a12 of the block in accordance with Equation (6). In the subframe f3, a data signal corresponding to a gray scale level "60" is provided to the panel pixel a21 of the block in accordance with Equation (7). In the subframe f4, a data signal having a gray scale level "340" is provided to the panel pixels a21 of the block in accordance with Equation (8), but exceeds the maximum value "255" of eight bits, thus here, a data signal corresponding to the highest value "255" is provided. A difference at this time, that is, an overflowing portion "85" is carried over to the second frame F2.

In this FIG. 14, a case is assumed in which, in the second frame F2, among gray scale levels of respective four display data pixels constituting one block, the gray scale levels dA11, dA12, and dA21 are decimal value "40", and the gray scale level dA22 is "80".

In the subframe f1 of the frame F2, a data signal corresponding to an average value "50" is provided to the panel pixels a11, a12, a21, and a22, in accordance with Equation (5). In the subframe f2, a data signal corresponding to a gray scale level "36.7" is provided to the panel pixel a12 of the block in accordance with Equation (6). In the subframe f3, a data signal corresponding to a gray scale level "30" is provided to the panel pixel a21 of the block in accordance with Equation (7). In the subframe f4, a data signal having a gray scale level "170" is provided to the panel pixels a21 of the block in accordance with Equation (8), but "21.3" obtained by dividing the overflowing portion "85" from the first frame F1 by the four subframes is added. In other words, in the subframe f4, the data signal corresponding to the gray scale level "191.3" is provided to the panel pixels a21 of the block. Note that, when no overflow occurs in the first frame F1, no addition is performed in the second frame F1.

A pixel having a high gray scale level, that is, a pixel with high brightness, is highly recognized by human eyes due to a residual image, and do not easily affect recognized brightness even when delay by as much as one frame occurs. Therefore, in the third exemplary embodiment, it is possible to reproduce a pixel with high brightness represented by display data through a plurality of frames.

Note that, although the overflow has been described here, an underflow may be considered. Specifically, for example, in the subframe f4 of the first frame F1, when the gray scale level of the panel pixel a21 is "−20" in accordance with Equation (8), a data signal corresponding to a lowest gray scale level "0" is provided to the panel pixel a21. Next, in the subframe f4 of the second frame F2, it is sufficient to provide a data signal corresponding to a gray scale level obtained by adding "−5" obtained by dividing an underflowing portion "−20" by 4 to the gray scale level of the panel pixel a21 calculated according to Equation (8).

Furthermore, an overflow occurs not only in the second exemplary embodiment, but also in the first exemplary embodiment as illustrated in FIG. 7. For this reason, a carry-over of an overflowing portion or underflowing portion to a next frame is also applicable to the first exemplary embodiment.

Fourth Exemplary Embodiment

In the first to third exemplary embodiments, the data processing unit 400 is configured to output an analog data signal to the liquid crystal panel 20, however, for example, may be configured to output a digital data signal, as a configuration in which the X driver 300 performs conversion to analog. Next, a fourth exemplary embodiment will be described in which the data processing unit 400 outputs a digital data signal.

Figure 15:
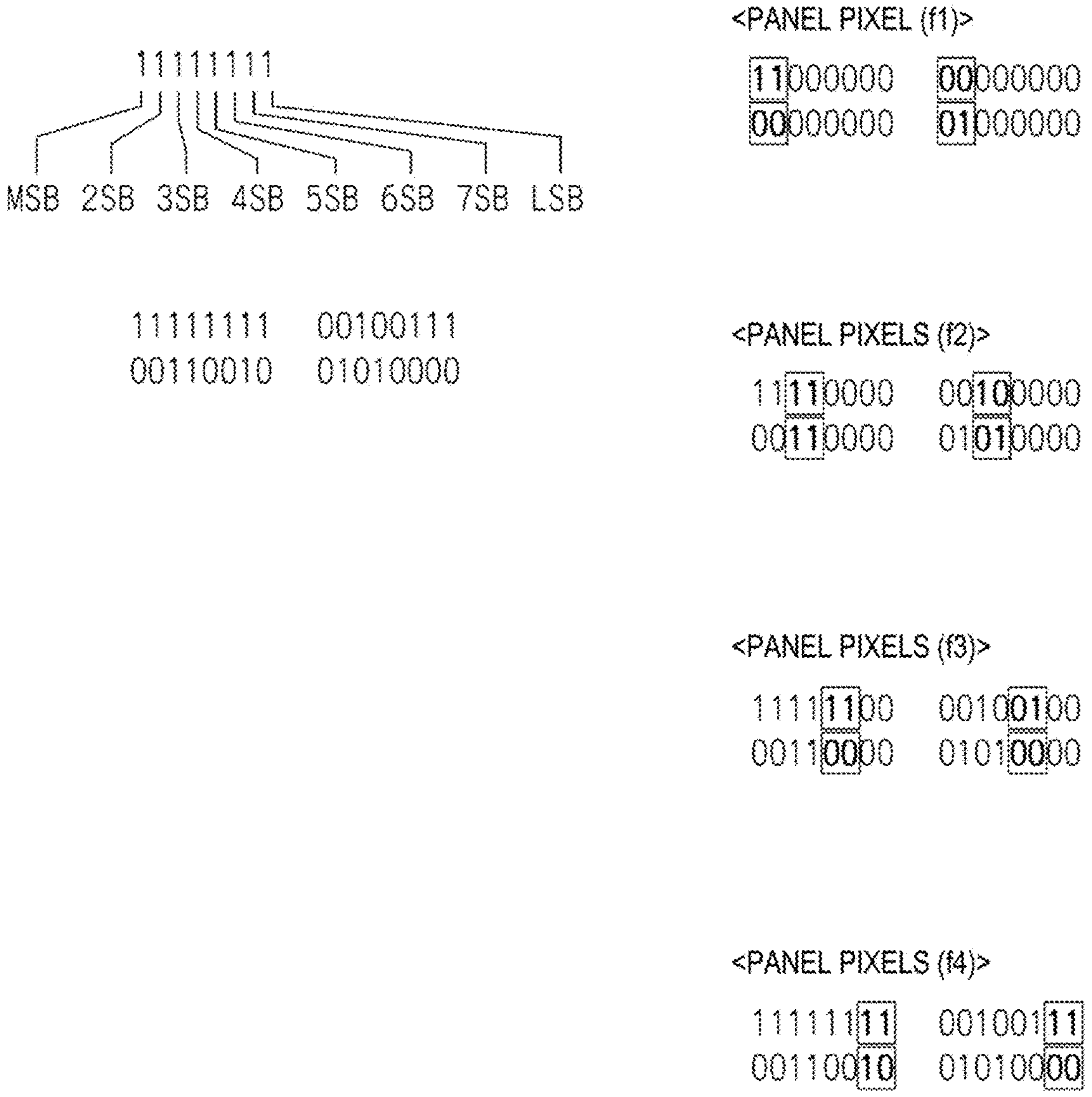
FIG. 15 is a diagram illustrating a relationship among the data signals provided to the panel pixels in the fourth exemplary embodiment.

FIG. 15 is a diagram illustrating output of a digital data signal in the fourth exemplary embodiment. Specifically, FIG. 15 is a diagram illustrating, when any one block in display data pixels and panel pixels is focused on, how display data of eight bits is supplied to which panel pixel, in the focused one block of the panel pixels.

Note that although not illustrated in FIG. 15, the display data pixels A11, A12, A21, A22, the gray scale levels dA11, dA12, dA21, dA22, the panel pixels a11, a12, a21, a22, the gray level da11, da12, da21, da22 are common to FIG. 5.

In the subframe f1, the arithmetic processing unit 430 outputs two bits of MSB and 2SB, of eight bits of the respective gray scale levels dA11, dA12, dA21, and dA22 of the display data pixels constituting the block in this order corresponding to the panel pixels a11, a12, a21, and a22. Note that, in the X driver 300, for 3SB to LSB, "0" is added to set the gray scale levels da11, da12, da21, and da22.

Then, the X driver 300 converts the gray scale levels da11, da12, da21, and da22 to analog, and writes data signals subjected to the analog signal conversion to the panel pixels a11, a12, a21, and a22 in this order.

In the subframe f2, the arithmetic processing unit 430 outputs two bits of 3SB and 4SB, of eight bits of the respective gray scale levels dA11, dA12, dA21, and dA22 of the display data pixels constituting the block in this order corresponding to the panel pixels a11, a12, a21, and a22. Note that, in the X driver 300, for the two bits of MSB and 2SB, bits supplied in the subframe f1 are retained and used, and for 5SB to LSB, "0" is added to set the gray scale levels da11, da12, da21, and da22. Then, the X driver 300 converts the gray scale levels da11, da12, da21, and da22 to analog, and provides data signals subjected to the analog signal conversion to the panel pixels a11, a12, a21, and a22 in this order.

In the subframe f3, the arithmetic processing unit 430 outputs two bits of 5SB and 6SB, of eight bits of the respective gray scale levels dA11, dA12, dA21, and dA22 of the display data pixels constituting the block in this order corresponding to the panel pixels a11, a12, a21, and a22. Note that, in the X driver 300, for the two bits of MSB and 2SB, the bits supplied in the subframe f1 are retained and used, for the two bits of 3SB and 4SB, bits supplied in the subframe f2 are retained and used, and for 7SB and LSB, "0" is added to set the gray scale levels da11, da12, da21, and da22. Then, the X driver 300 converts the gray scale levels da11, da12, da21, and da22 to analog, and provides data signals subjected to the analog signal conversion to the panel pixels a11, a12, a21, and a22 in this order.

In the subframe f4, the arithmetic processing unit 430 outputs two bits of 7SB and LSB, of eight bits of the respective gray scale levels dA11, dA12, dA21, and dA22 of the display data pixels constituting the block in this order corresponding to the panel pixels a11, a12, a21, and a22. Note that, in the X driver 300, for the two bits of MSB and 2SB, the bits supplied in the subframe f1 are retained and used, for the two bits of 3SB and 4SB, the bits supplied in the subframe f2 are retained and used, and for two bits of 5SB and 6SB, the bits supplied in the subframe f3 are retained and used. Then, the X driver 300 converts the gray scale levels da11, da12, da21, and da22 to analog, and provides data signals subjected to the analog signal conversion to the panel pixels a11, a12, a21, and a22 in this order.

In the fourth exemplary embodiment, in the liquid crystal panel 20, of the display data of eight bits, display is performed based on the higher two bits in the subframe f1, display is performed based on the higher four bits in the subframe f2, display is performed based on the higher six bits in the subframe f3, and display is performed based on the higher eight bits in the subframe f4. Thus, in the fourth exemplary embodiment, in the liquid crystal panel 20, an image is displayed in which accuracy of a gray scale level gradually increases from the subframe f1 to f4.

In the fourth exemplary embodiment, it is necessary to provide individual data signals to four panel pixels in the subframes f1 to f4. However, an amount of data output from the data processing unit 400 toward the liquid crystal panel 20 is reduced to ¼, since is it sufficient to output data of two bits to the four panel pixels in each subframe, as compared to a case where data of eight bits is output to the four panel pixels in the subframes f1 to f4. Therefore, in the fourth exemplary embodiment as well, reduction of data output toward the liquid crystal panel 20 makes it possible to suppress a delay in display.

Fifth Exemplary Embodiment

Next is a diagram illustrating a specific example of the Y driver 230 and the demultiplexer 240 applicable to the first to third exemplary embodiments.

Figure 16:
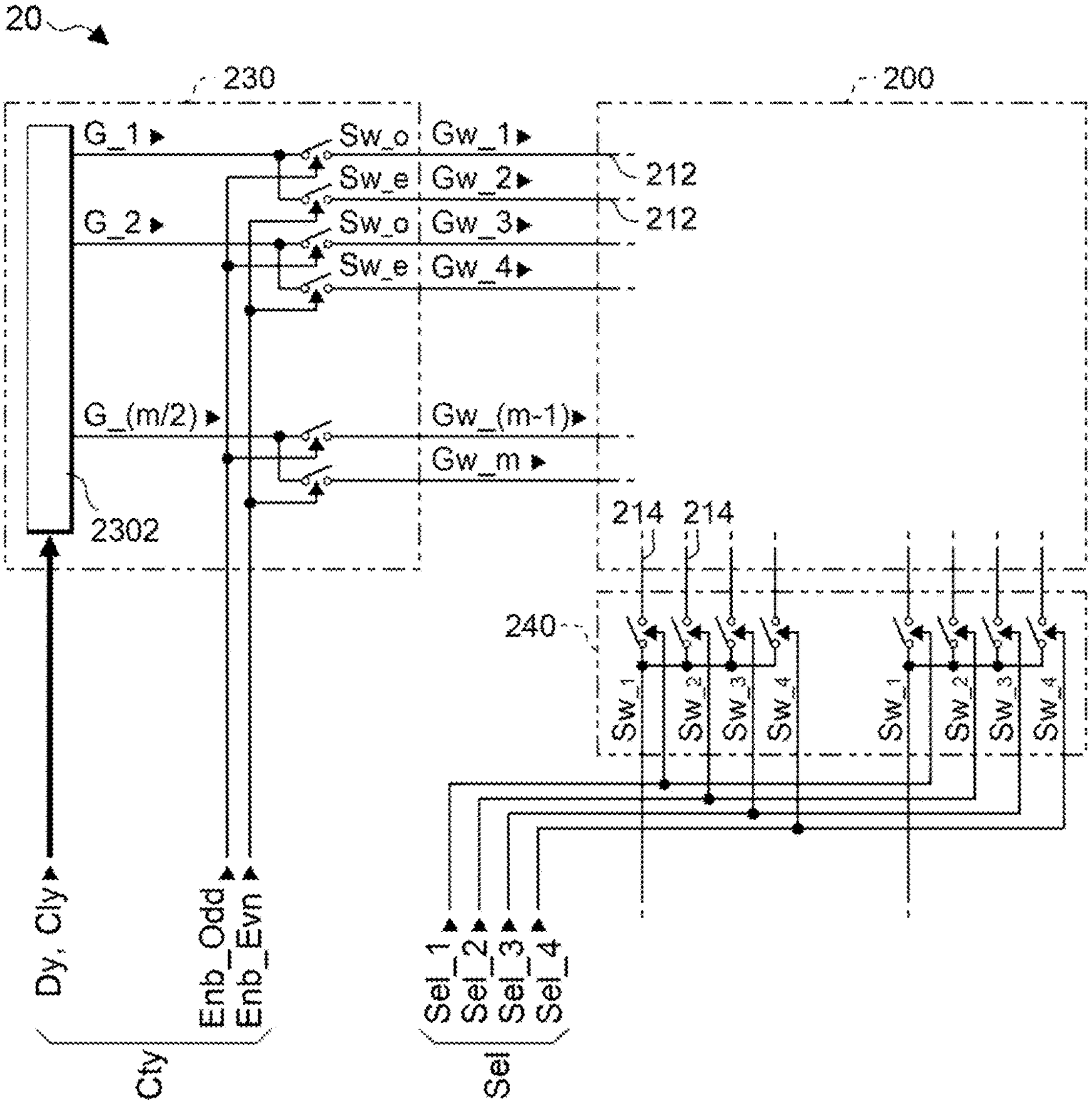
FIG. 16 is a diagram illustrating a configuration of a Y driver and a demultiplexer in a fifth exemplary embodiment.

FIG. 16 is a diagram illustrating a configuration of the Y driver 230 and the demultiplexer 240. The Y driver 230 includes a shift register 2302, a switch Sw_o provided corresponding to an odd-numbered row, and a switch Sw_e provided corresponding to an even-numbered row.

The shift register 2302 sequentially transfers a pulse Dy supplied at start timing of each of the subframes f1 to f4, for one cycle of a clock signal Cly at a time, and outputs the pulse Dy as transfer signals G_1, G_2, . . . , G (m/2). Note that, the number of output ends of the shift register 2302 is half of m in the present exemplary embodiment.

The switch Sw_o is provided between an output end of the shift register 2302 and the scanning lines 212 in an odd-numbered row, is controlled to be on when a control signal Enb_Odd is at an H level, and is controlled to be off when the control signal Enb_Odd is at an L level.

The switch Sw_e is provided between an output end of the shift register 2302 and the scanning lines 212 in an even-numbered row, is controlled to be on when a control signal Enb_Evn is at the H level, and is controlled to be off when the control signal Enb_Evn is at the L level.

Note that, one end of the switch Sw_o corresponding to one odd-numbered row and one end of the switch Sw_e corresponding to an even-numbered row following the odd-numbered row are commonly connected to an output end from which a transfer signal is output corresponding to the odd-numbered row and the even-numbered row in the shift register 2302.

The demultiplexer 240 distributes data signals supplied from the X driver 300 to the grouped data lines 214. This example is an example in which the data lines 241 in every four columns are grouped.

Switches Sw_1 to Sw_4 are provided between the data lines 214 in four columns included in one group and output ends to which data signals are supplied from the X driver 300, respectively.

Specifically, the switch Sw_1 is provided between the data line 214 in a first column counted from left in the figure, among the data lines 214 in four columns included in one group, and an output end of the X driver 300, and is controlled to be on when a control signal Sel_1 is at the H level, and is controlled to be off when the control signal Sel_1 is at the L level.

The switches Sw_2, Sw_3, and Sw_4 are provided between the data lines 214 in a second column, a third column, and a fourth column in this order counted from left among the data lines 214 in four columns included in one group, and the output ends of the X driver 300, respectively. The switches Sw_2, Sw_3, and Sw_4 are controlled to be on in this order when control signals Sel_2, Sel_3, and Sel_4 are at the H level, and are controlled to be off when the control signals Sel_2, Sel_3, and Sel_4 are at the L level.

One ends of the respective switches Sw_1 to Sw_4 included in the same group are commonly connected to an output end to which a data signal is supplied corresponding to the group in the X driver 300.

Note that, the pulse Dy, the clock signal Cly, the control signals Enb_Odd, and Enb_Evn are included in the control signal CtrY in FIG. 1, and, for example, are supplied from the arithmetic processing unit 430.

Further, the control signals Sel_1 to Sel_4 are included in the control signal Sel in FIG. 1, and, for example, are supplied from the arithmetic processing unit 430.

Figure 17:
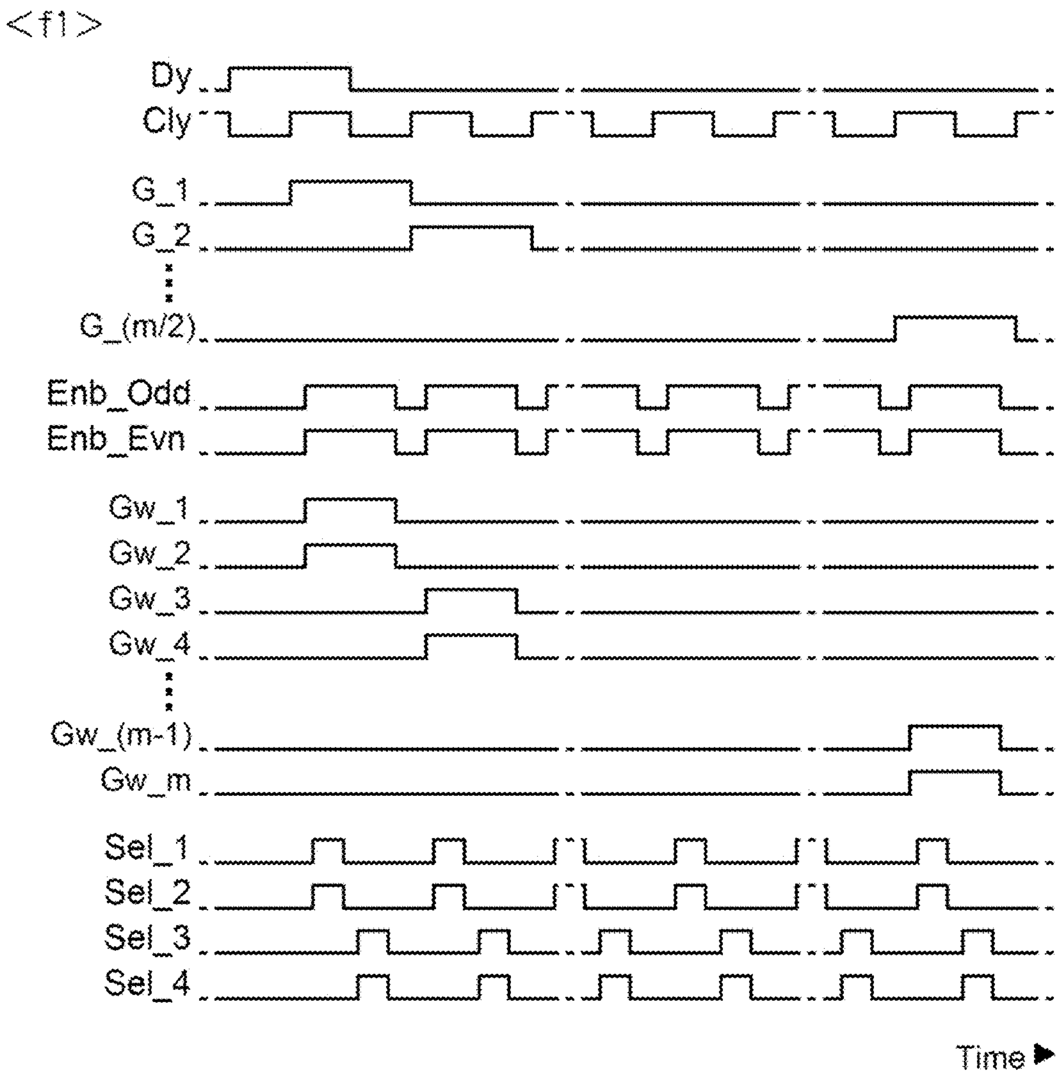
FIG. 17 is a diagram illustrating operation of the Y driver and the demultiplexer.
Figure 18:
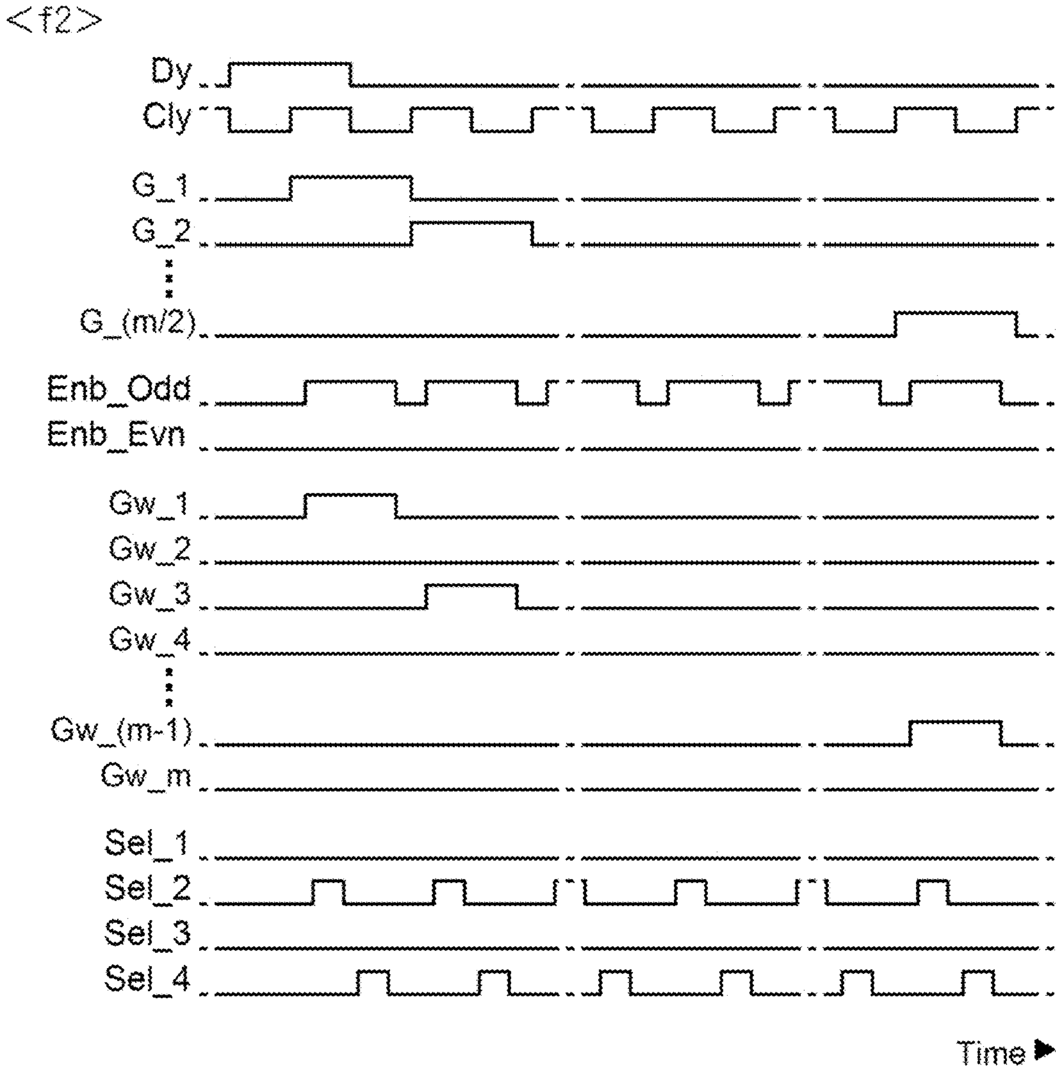
FIG. 18 is a diagram illustrating operation of the Y driver and the demultiplexer.
Figure 19:
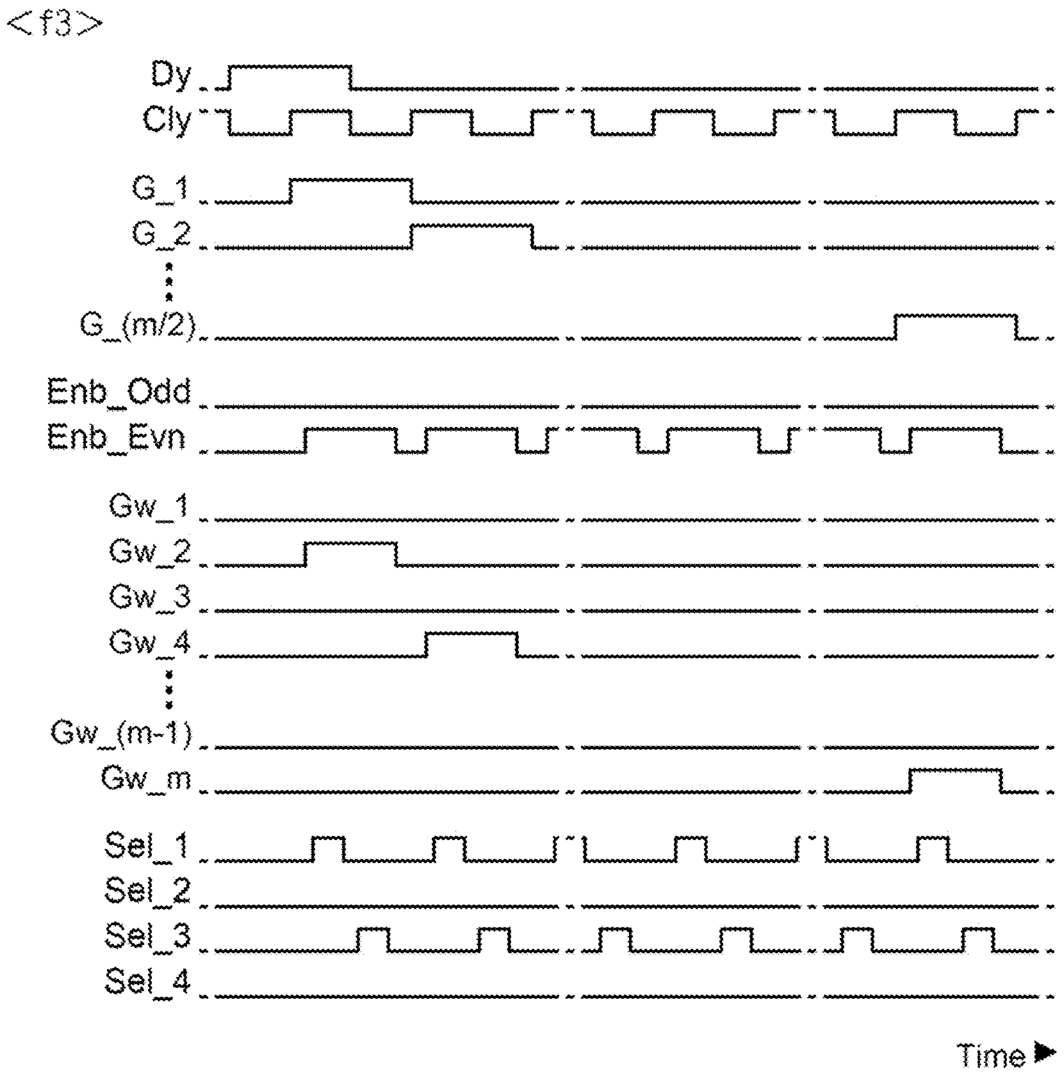
FIG. 19 is a diagram illustrating operation of the Y driver and the demultiplexer.
Figure 20:
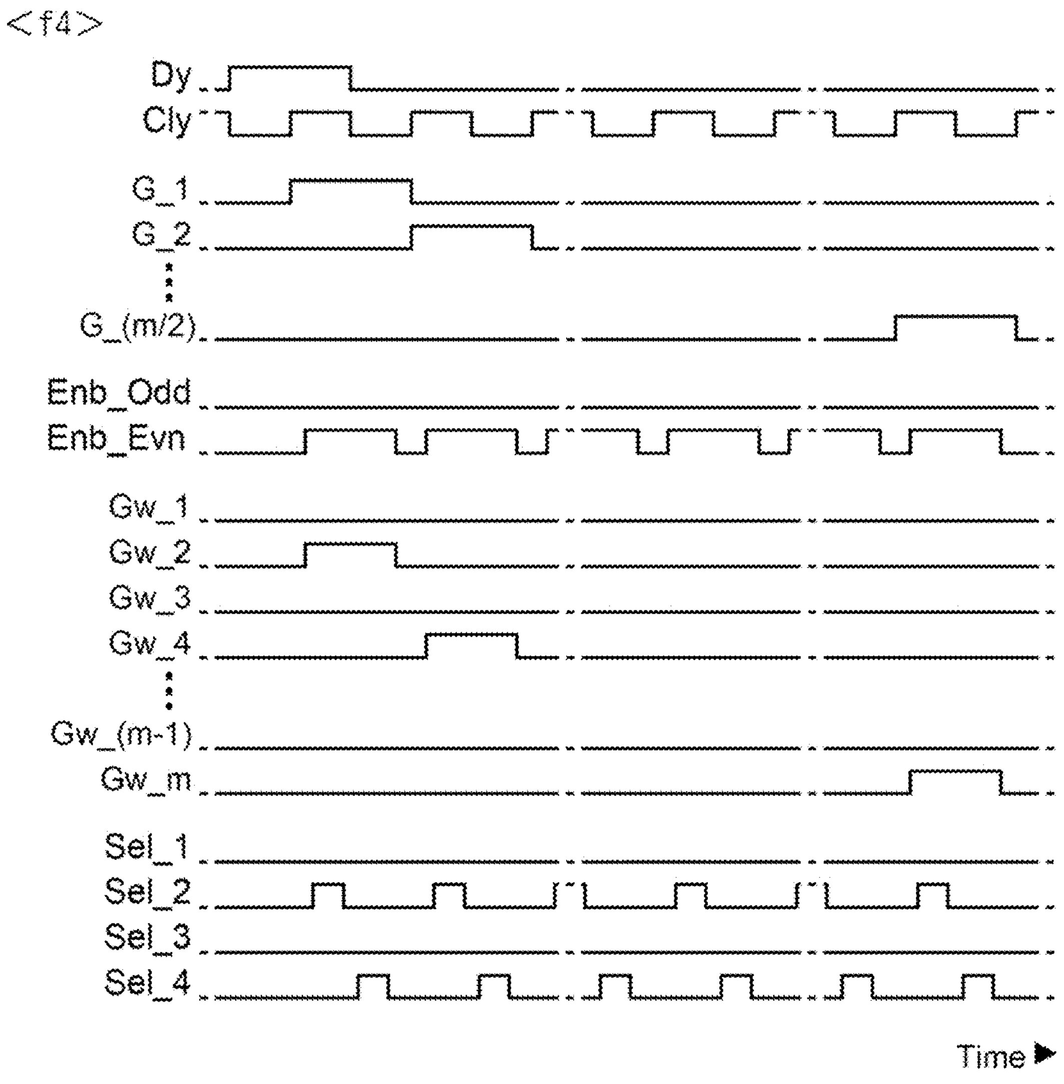
FIG. 20 is a diagram illustrating operation of the Y driver and the demultiplexer.

FIG. 17 to FIG. 20 are diagrams illustrating operation of the Y driver 230 and the demultiplexer 240, in particular, FIG. 17 illustrates operation in the subframe f1, FIG. 18 illustrates operation in the subframe f2, FIG. 19 illustrates operation in the subframe f3, and FIG. 20 illustrates operation in the subframe f4.

As illustrated in these figures, in the subframes f1 to f4, the shift register 2302 sets the transfer signals G_1, G_2, . . . , G(m/2) sequentially and exclusively to the H level, and outputs the signals, by capturing the pulse Dy at the rising of the clock signal Cly and transferring the pulse Dy.

As illustrated in FIG. 17, in the subframe f1, the control signals Enb_Odd and Enb_Evn are delayed at the rising of the clock signal Cly and set to the H level, and set to the L level in advance at the falling of the clock signal Cly. In other words, the control signals Enb_Odd and Enb_Evn are included in a time period in which any of the transfer signals G_1, G_2, . . . , G(m/2) is set to the H level, and are set to the H level in a time period that is temporally shorter than a time period in which any of the transfer signals G_1, G_2, . . . , G(m/2) is set to the H level.

Thus, in the subframe f1, at first a scanning signal Gw_1 and a scanning signal Gw_2 are set to the H level, next a scanning signal Gw_3 and a scanning signal Gw_4 are set to the H level next, and finally scanning signals Gw_(m−1) and Gw_m are set to the H level. In this manner, in the subframe f1, two rows, that is, the scanning line 212 in an odd-numbered row and the scanning line 212 in an even-numbered row following the odd-numbered row, are selected at a time sequentially.

In the subframe f1, the control signals Sel_1 and Sel_2 are set to the H level in a part of a time period in which the control signals Enb_Odd and Enb_Evn are set to the H level. Further, in the subframe f1, the control signals Sel_3 and Sel_4 are set to the H level after the partial time period in which the control signals Enb_Odd and Enb_Evn are set to the H level.

In other words, in the subframe f1, first the control signals Sel_1 and Sel_2 are set to the H level in the time period in which the scanning lines 212 in the two rows are selected, after the control signals Sel_1 and Sel_2 are set to the L level, the control signals Sel_3 and Sel_4 are set to the H level, and the control signals Sel_1 and Sel_2 are set to the L level.

Thus, in the subframe f1, in a time period in which the scanning lines 212 in two rows are selected, among four columns included in a group, the data lines 214 in two columns of a first column and a second column are selected, and then the data lines 214 in two columns of a third column and a fourth column are selected.

As illustrated in FIG. 18, in the subframe f2, the control signal Enb_Odd is delayed at the rising of the clock signal Cly and set to the H level, and set to the L level in advance at the falling of the clock signal Cly. In the subframe f2, the control signal Enb_Evn is at the L level.

Thus, in the subframe f2, first the scanning signal Gw_1 is set to the H level, then the scanning signal Gw_3 is set to the H level, and finally the scanning signal Gw_(m−1) is set to the H level.

In this manner, in the subframe f2, only the scanning lines 212 in odd-numbered rows are selected one at a time sequentially.

In the subframe f2, the control signal Sel_2 is set to the H level in a part of a time period in which the control signal Enb_Odd is set to the H level. Furthermore, in the subframe f1, the control signal Sel_4 is set to the H level after the partial time period described above, in the period in which the control signal Enb_Odd is set to the H level. In other words, in the subframe f2, first the control signal Sel_2 is set to the H level in the time period in which the scanning line 212 in the odd-numbered row is selected, after the control signal Sel_2 is set to the L level, the control signal Sel_4 is set to the H level, and the control signal Sel_4 is set to the L level. Furthermore, in the subframe f2, the control signals Sel_1 and Sel_3 are at the L level.

Thus, in the subframe f2, in a time period in which the scanning line 212 in an odd-numbered row is selected, among four columns included in a group, the data line 214 in a second column is selected, and then the data line 214 in a fourth column is selected.

As illustrated in FIG. 19, in the subframe f3, the control signal Enb_Evn is delayed at the rising of the clock signal Cly and set to the H level, and set to the L level in advance at the falling of the clock signal Cly. In the subframe f2, the control signal Enb_Odd is at the L level.

Thus, in the subframe f3, first the scanning signal Gw_2 is set to the H level, then the scanning signal Gw_4 is set to the H level, and finally the scanning signal Gw_m− is set to the H level.

In this manner, in the subframe f3, only the scanning lines 212 in even-numbered rows are selected one at a time sequentially.

In the subframe f3, the control signal Sel_1 is set to the H level in a part of a time period in which the control signal Enb_Evn is set to the H level. Furthermore, in the subframe f3, the control signal Sel_3 is set to the H level after the partial time period described above, in the period in which the control signal Enb_Evn is set to the H level. In other words, in the subframe f3, first the control signals Sel_1 is set to the H level in the time period in which the scanning lines 212 in the even-numbered row is selected, after the control signal Sel_1 is set to the L level, the control signal Sel_3 is set to the H level, and the control signal Sel_3 is set to the L level. Furthermore, in the subframe f3, the control signals Sel_2 and Sel_4 are at the L level.

Thus, in the subframe f3, in a time period in which the scanning line 212 in an even-numbered row is selected, among four columns included in a group, the data line 214 in a first column is selected, and then the data line 214 in a third column is selected.

As illustrated in FIG. 20, in the subframe f4, the control signal Enb_Evn is delayed at the rising of the clock signal Cly and set to the H level, and set to the L level in advance at the falling of the clock signal Cly. In the subframe f4, the control signal Enb_Odd is at the L level.

Thus, in the subframe f4, as in the case of the subframe f3, first the scanning signal Gw_2 is set to the H level, then the scanning signal Gw_4 is set to the H level, and finally the scanning signal Gw_m is set to the H level.

In this manner, in the subframe f3, only the scanning lines 212 in even-numbered rows are selected one at a time sequentially.

In the subframe f3, the control signal Sel_2 is set to the H level in a part of a time period in which the control signal Enb_Evn is set to the H level. Furthermore, in the subframe f4, the control signal Sel_4 is set to the H level after the partial time period described above, in the period in which the control signal Enb_Evn is set to the H level. In other words, in the subframe f4, first the control signal Sel_2 is set to the H level in the time period in which the scanning line 212 in the even-numbered row is selected, after the control signal Sel_2 is set to the L level, the control signal Sel_4 is set to the H level, and the control signal Sel_4 is set to the L level. Furthermore, in the subframe f4, the control signals Sel_1 and Sel_3 are at the L level.

Thus, in the subframe f4, in a time period in which the scanning line 212 in an even-numbered row is selected, among four columns included in a group, the data line 214 in a second column is selected, and then the data line 214 in a fourth column is selected.

The normal Y driver 230 that selects the scanning lines 212 one row at a time in order does not have the switches Sw_o and Sw_e. In addition, in a configuration of the demultiplexer 240 in which data signals are distributed to a plurality of the grouped data lines 214, the control signal Sel is changed. Accordingly, the Y driver 230 and the demultiplexer 240 can be realized without greatly changing the configurations thereof.

Sixth Exemplary Embodiment

In the above-described exemplary embodiments, except in the fourth exemplary embodiment, the configuration is adopted in which data signals are provided to the panel pixel a12 in the subframe f2, to the panel pixel a21 in the subframe f3, and to the panel pixel a22 in the subframe f4, respectively. In other words, the order in which data signals are provided to the panel pixels in the subframes f2, f3, and f4 is fixed. When an order of panel pixels for providing data signals is fixed, a crosstalk noise is generated and visually recognized easily due to coupling between specific panel pixels in some cases.

Thus, a sixth exemplary embodiment in which such a crosstalk noise is made to be unlikely to be visually recognized will be described.

Figure 21:
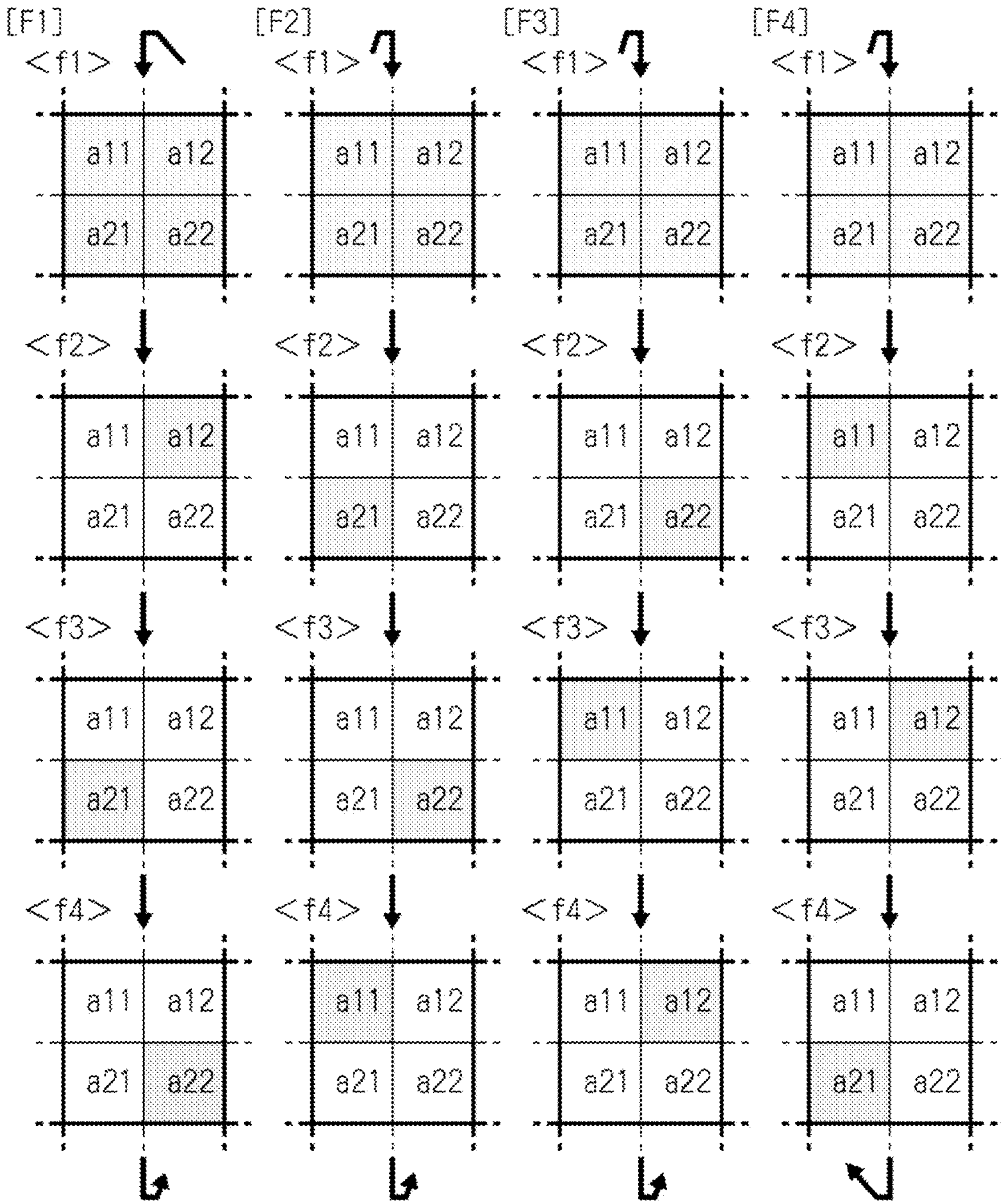
FIG. 21 is a diagram illustrating an example of rotation in a sixth exemplary embodiment.

FIG. 21 is a diagram illustrating an order in which data signals are provided to panel pixels in the sixth exemplary embodiment.

In the sixth exemplary embodiment illustrated in this figure, an order in which data signals are provided to panel pixels with the four frames F1 to F4 as one period is changed as follows.

In the first frame F1, data signals are provided to the panel pixels a11, a12, a21, a22 in the subframe f1, provided to the panel pixel a12 in subframe f2, provided to the panel pixel a21 in subframe f3, and provided to the panel pixel a22 in the subframe f4.

In the second frame F2, data signals are provided to the panel pixels a11, a12, a21, a22 in the subframe f1, provided to the panel pixel a21 in subframe f2, provided to the panel pixel a22 in subframe f3, and provided to the panel pixel a11 in the subframe f4.

In the third frame F3, data signals are provided to the panel pixels a11, a12, a21, a22 in the subframe f1, provided to the panel pixel a22 in subframe f2, provided to the panel pixel a11 in subframe f3, and provided to the panel pixel a12 in the subframe f4.

In the fourth frame F4, data signals are provided to the panel pixels a11, a12, a21, a22 in the subframe f1, provided to the panel pixel a11 in subframe f2, provided to the panel pixel a12 in subframe f3, and provided to the panel pixel a22 in the subframe f4.

Note that in the next frame of the frame F1, data signals are provided in the order in the frame F1.

As described above, in the sixth exemplary embodiment, the order in which the data signals are provided to the panel pixels is rotated for each of the frames F1 to F4, and thus a crosstalk noise is moved for each frame. Therefore, according to the sixth exemplary embodiment, it is possible to make the crosstalk noise less likely to be visually recognized.

Seventh Exemplary Embodiment

Figure 22:
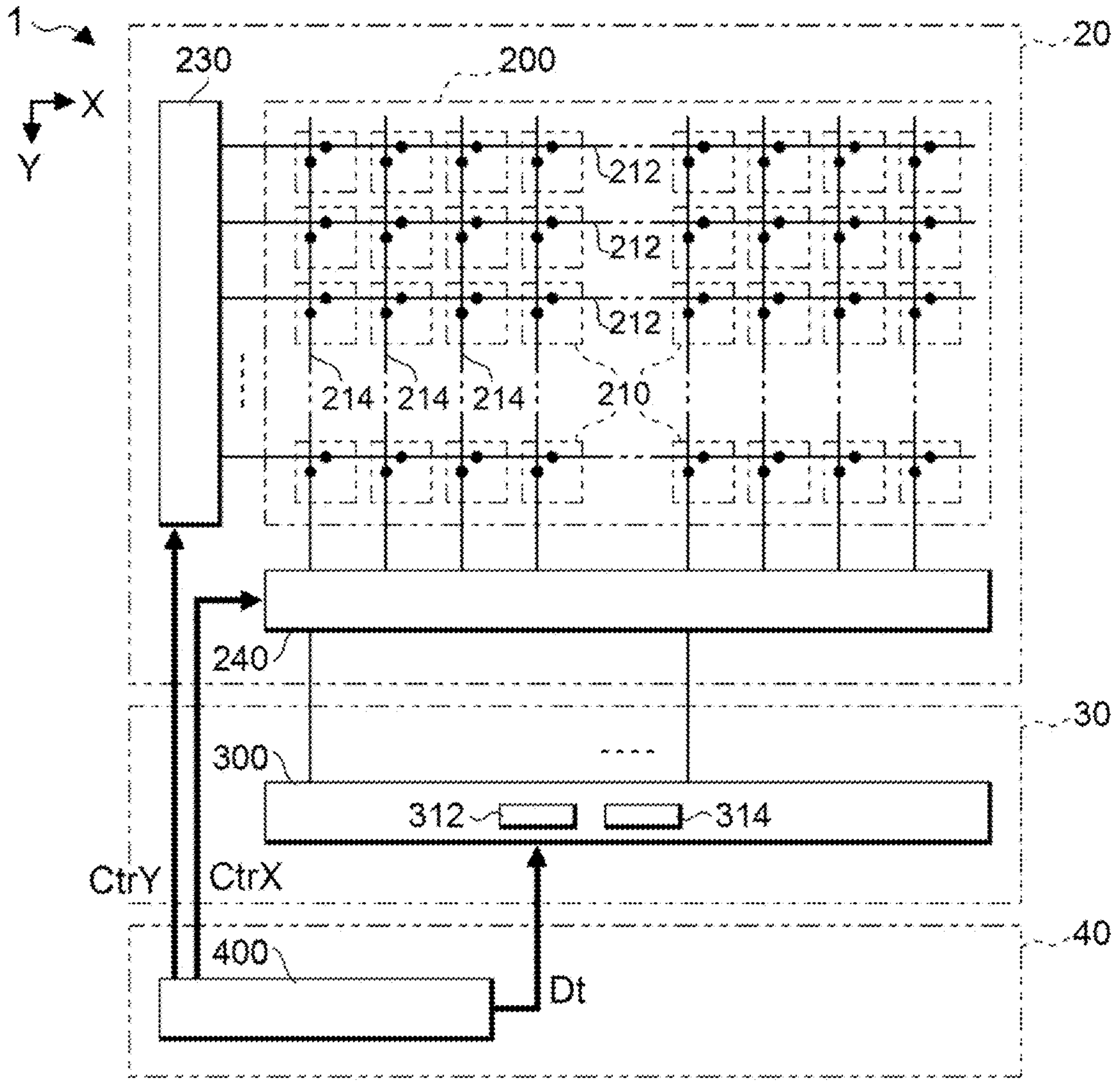
FIG. 22 is a block diagram illustrating a display system according to a seventh exemplary embodiment.

In the configuration illustrated in FIG. 16, the following elements may be provided on the liquid crystal panel 20 side other than the data processing unit 400. FIG. 22 is a block diagram illustrating a configuration of the display system 1 having such elements.

The data processing unit 400 transmits the processing data Dt computed by Equations (1) to (4) or Equations (5) to (8), and the X driver 300 that receives the processing data Dt is provided with a storage unit 312 and a conversion unit 314. The storage unit 312 stores the processing data Dt transmitted from the data processing unit 400, and the conversion unit 314 converts the processing data Dt stored in the storage unit 312 to analog by performing other operations and outputs the processing data Dt as a data signal.

Note that in the storage unit 312, it is sufficient to store the processing data transmitted for each of the subframes f1 to f4, and thus a capacity for storing ¼ of display data for one frame is enough.

Eighth Exemplary Embodiment

In the configuration illustrated in FIG. 16, the liquid crystal panel 20 may be provided with the following element. Specifically, a configuration may be adopted in which, the liquid crystal panel 20 identifies the subframes f1 to f4, and transmits the identified information to the arithmetic processing unit 430 of the data processing unit 400, and the arithmetic processing unit 430 and the liquid crystal panel 20 share information about in which subframe among the subframes f1 to f4 the current time is.

Figure 23:
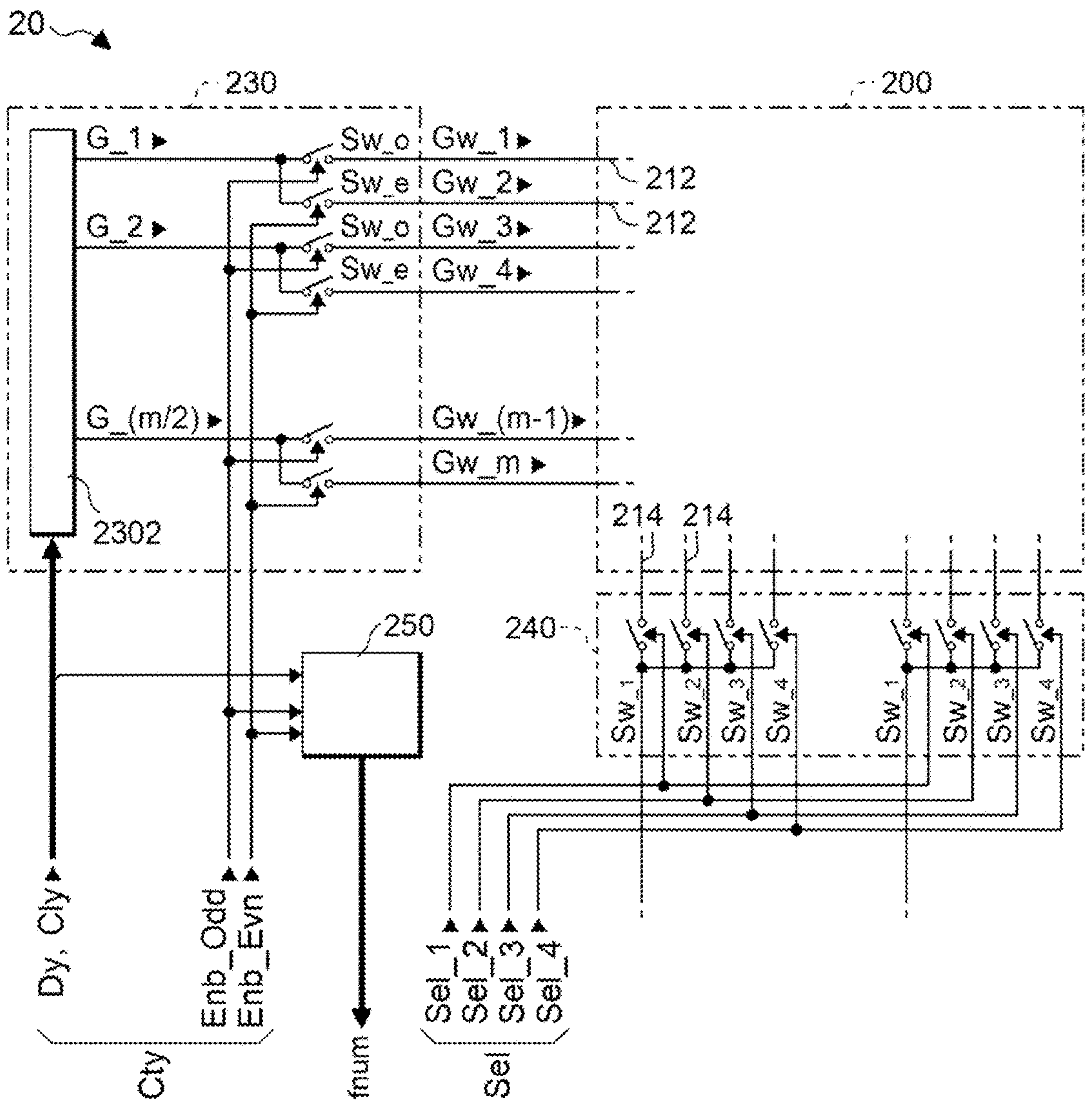
FIG. 23 is a diagram illustrating a liquid crystal panel in an eighth exemplary embodiment.

FIG. 23 is a diagram illustrating a configuration of the liquid crystal panel 20 having this element. FIG. 23 is different from FIG. 16 in that the decoder 250 is provided. As described above, the control signals Enb_Odd and Enb_Evn are as illustrated in FIG. 17 to FIG. 20 in the subframes f1 to f4.

The decoder 250 identifies from the pulse Dy, the control signals Enb_Odd, and Enb_Evn in which subframe the current time is, and transmits the identified result, that is, the information of the identified subframe, to the arithmetic processing unit 430. Specifically, the decoder 250 identifies the current time is in the subframe f1 when the control signals Enb_Odd and Enb_Evn have waveforms illustrated in FIG. 17, respectively, and identifies the current time is in the subframe f2 when the control signal Enb_Odd and Enb_Evn have waveforms illustrated in FIG. 18, respectively. After identifying the current time is in the subframe f2, the decoder 250 identifies that the current time is in the subframe f3 when the first pulse Dy is output, and identifies the current time is in the subframe f4 when the second pulse Dy is output.

Thus, in the configuration with the decoder 250, it is possible to synchronize or share information about in which subframe the current time is, between the liquid crystal panel 20 and the arithmetic processing unit 430.

APPLICATIONS AND MODIFICATIONS

In the above-described first to eighth exemplary embodiments (hereinafter, referred to as exemplary embodiments and the like), various modifications or applications are possible as follows.

In the exemplary embodiment and the like, one frame F is divided into the four subframes f1 to f4, and display data pixels and panel pixels are partitioned into two rows and two columns, but the present disclosure is not limited to this example.

For example, it is sufficient that display data pixels in one frame are partitioned into blocks of N pixels corresponding to a in a vertical direction×b in a horizontal direction, the data processing unit 400 performs predetermined processing on display data of N display data pixels, transmits processing data, which has an amount of data of (1/N) pixels to the liquid crystal panel 20 in N subframes. It is sufficient that panel pixels of the liquid crystal panel 20 are partitioned into blocks of N pixels corresponding to a in a vertical direction×b in a horizontal direction, and data signals based on processing data supplied from the data processing unit 400 are provided to N of the panel pixels included in one block in particular one subframe among the N subframes, in a subframe other than the particular one subframe, data signals based on the processing data supplied from the data processing unit 400 are provided in a predetermined order to (N−1) panel pixels included in the one block. Note that N=a×b, one of a and b is an integer equal to or greater than 1, and another of a and b is an integer equal to or greater than 2.

Additionally, as in the fourth exemplary embodiment, when a gray scale level of one display data pixel is specified by Q bits, the data processing unit 400 may divide one frame into R subframes, and in each of the R subframes, higher (Q/R) bits of Q bits of the gray scale level of one display data pixel may be sequentially extracted and output to a panel pixel corresponding to the liquid crystal panel 20, in the liquid crystal panel 20, the (Q/R) bits supplied in each subframe may be sequentially accumulated, and in the panel pixel, a gray scale level expressed by the bits accumulated in each subframe may be sequentially expressed. Note that, Q and R are each an integer equal to or greater than 2.

In the exemplary embodiments and the like, the transmissive type is given as an example of the liquid crystal panel 20, but a reflective type may be used. Further, the liquid crystal panel 20 is given as an example of a display panel, but organic EL panels can also be applied.

In addition, an application example of a display panel is not limited to a projector, and application to a display system is suitable for which a low delay in display is required, such as a game device, a head mount display, an on-board system that displays a rear view or a side view, a display device for a tablet PC, and the like.

What is claimed is:

1. A display system, comprising:

a display panel having panel pixels partitioned into blocks of N panel pixels corresponding to a in vertical direction×b in a horizontal direction, where N=a×b, a and b each being an integer equal to or greater than 2; and a data processing unit configured to partition display data pixels in one frame, having a bit amount of gray scale level data, into blocks of N display data pixels corresponding to a in vertical direction×b in a horizontal direction, perform predetermined processing on display data of N display data pixels of one block of display data pixels, and transmit processing data with a bit amount of 1/N of the gray scale level data to the display panel in each subframe of N subframes of the one frame, wherein in a particular one subframe of the N subframes, data signals based on processing data supplied from the data processing unit are provided to N panel pixels included in one block of panel pixels, and in a subframe other than the particular one subframe of the N subframes, data signals based on the processing data supplied from the data processing unit are provided in a predetermined order into only N−1 panel pixels included in the one block and are not provided in the remaining one panel pixel included in the one block.

2. The display system according to claim 1, wherein the data processing unit, in the particular one subframe, transmits display data, of the N display data pixels, having a minimum gray scale level, as the processing data.

3. The display system according to claim 1, wherein the data processing unit, in the particular one subframe, calculates an average value of gray scale levels of the N display data pixels, and transmits the average value as the processing data.

4. The display system according to claim 2, wherein the data processing unit, when an overflow or an underflow occurs in a last subframe among N subframes in one frame, allocates overflowing or underflowing portion in a last subframe of a next frame subsequent to the one frame.

5. The display system according to claim 2, wherein the particular one subframe is a first subframe of the N subframes.

6. The display system according to claim 1, wherein the data processing unit is configured to partition display data pixels in another frame into blocks of N display data pixels, perform predetermined processing on the display data of N display data pixels of one block of display data pixels, and transmit processing data with amount of 1/N display data pixels to the display panel in each subframe of N subframes of the other frame, and an order in which data signals are provided to N−1 panel pixels included in one block in a subframe of the other frame other than a particular one subframe of the other frame varies from the predetermined order in the one frame.

7. The display system according to claim 1, wherein the display panel includes a storage unit configured to store the processing data, and is configured such that data signals are provided to corresponding panel pixels based on the processing data stored in the storage unit.

8. The display system according to claim 1, wherein the display panel includes a decoder configured to identify the N subframes and transmit a result of the identification to the data processing unit.

* * * * *